(12) United States Patent
Afshang et al.

(10) Patent No.: US 12,261,726 B2
(45) Date of Patent: Mar. 25, 2025

(54) SIGNALING STRUCTURE FOR WIRELESS COMMUNICATION NETWORK

(71) Applicant: Telefonaktiebolaget LM Ericsson (publ), Stockholm (SE)

(72) Inventors: Mehrnaz Afshang, San Josè, CA (US); Mohammad Mozaffari, San Josè, CA (US); Jung-Fu Cheng, Fremont, CA (US); Dennis Hui, Sunnyvale, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 18/342,269

(22) Filed: Jun. 27, 2023

(65) Prior Publication Data

US 2023/0344692 A1 Oct. 26, 2023

Related U.S. Application Data

(63) Continuation of application No. 16/952,780, filed on Nov. 19, 2020, now Pat. No. 11,750,428.

(51) Int. Cl.
*H04L 27/26* (2006.01)
(52) U.S. Cl.
CPC .... *H04L 27/26025* (2021.01); *H04L 27/2607* (2013.01); *H04L 27/26524* (2021.01)
(58) Field of Classification Search
CPC ........... H04L 27/26025; H04L 27/2607; H04L 27/26524
See application file for complete search history.

(56) References Cited

U.S. PATENT DOCUMENTS

| | | | |
|---|---|---|---|
| 11,750,428 B2* | 9/2023 | Afshang | H04L 27/26524 370/329 |
| 2016/0352551 A1* | 12/2016 | Zhang | H04L 5/0007 |
| 2018/0091267 A1* | 3/2018 | Kim | H04L 5/001 |
| 2019/0268205 A1 | 8/2019 | Shin et al. | |
| 2020/0154458 A1* | 5/2020 | Zhang | H04W 72/23 |

FOREIGN PATENT DOCUMENTS

WO 2021165770 A1 8/2021

OTHER PUBLICATIONS

International Search Report and Written Opinion dated Sep. 2, 2021 for International Application No. PCT/SE2021/050538, consisting of 12 pages.
3GPP TS 38.101-2 V16.3.1; 3rd Generation Partnership Project: Technical Specification Group Radio Access Network; NR; User Equipment (UE) radio transmission and reception; Part 2: Range 2 Standalone (Release 16), Mar. 2020, consisting of 170-pages.

(Continued)

*Primary Examiner* — Melvin C Marcelo
*Assistant Examiner* — Natali Pascual Peguero
(74) *Attorney, Agent, or Firm* — Weisberg I.P. Law, P.A.

(57) ABSTRACT

There is disclosed a method of operating a radio node in a wireless communication network, the method including communicating based on a signaling structure, the signaling structure including a number R of long symbols and/or a number Nsym of regular symbols, wherein R and/or Nsym is based on the subcarrier spacing associated to the signaling structure and/or a cyclic prefix length of a long symbol and/or a cyclic prefix length of a regular symbol. The disclosure also pertains to related devices and methods.

16 Claims, 5 Drawing Sheets

(56) References Cited

OTHER PUBLICATIONS

3GPP TS 38.211 V15.7.0; 3rd Generation Partnership Project: Technical Specification Group Radio Access Network; NR; Physical channels and modulation (Release 15), Sep. 2019, consisting of 97-pages.

3GPP TSG RAN WG1 Meeting #101-E R1-2005193; Title: Summary #3 of email discussions for [101-e-Post-NR-52_71_GHz]; Source: Moderator (Intel Corporation); Agenda Item: 8.1; Document for: Discussion; Date: May 25-Jun. 5, 2020, consisting of 55-pages.

* cited by examiner

SIGNALING STRUCTURE FOR WIRELESS COMMUNICATION NETWORK

CROSS-REFERENCE TO RELATED APPLICATION

This Application is a Continuation of U.S. application Ser. No. 16/952,780 filed Nov. 19, 2020, entitled "SIGNALING STRUCTURE FOR WIRELESS COMMUNICATION NETWORK", the entirety of which is incorporated herein by reference.

TECHNICAL FIELD

This disclosure pertains to wireless communication technology, in particular for high frequencies.

BACKGROUND

For future wireless communication systems, use of higher frequencies is considered, which allows large bandwidths to be used for communication. However, use of such higher frequencies brings new problems, for example regarding physical properties and timing. Ubiquitous or almost ubiquitous use of beamforming, with often comparatively small beams, may provide additional complications that need to be addressed.

SUMMARY

It is an object of this disclosure to provide improved approaches of handling wireless communication, in particular regarding the signaling structure based on cyclic prefix use. The approaches are particularly suitable for high frequencies, e.g. millimeter wave communication, in particular for radio carrier frequencies around and/or above 52.6 GHz, which may be considered high radio frequencies (high frequency) and/or millimeter waves. The carrier frequency/ies may be between 52.6 and 140 GHz, e.g. with a lower border between 52.6, 55, 60, 71 GHz and/or a higher border between 71, 72, 90, 114, 140 GHz or higher, in particular between 55 and 90 GHz, or between 60 and 72 GHz; however, higher frequencies may be considered. The carrier frequency may in particular refer to a center frequency or maximum frequency of the carrier. The radio nodes and/or network described herein may operate in wideband, e.g. with a carrier bandwidth of 1 GHz or more, or 2 GHz or more, or even larger, e.g. up to 8 GHz; the scheduled or allocated bandwidth may be the carrier bandwidth, or be smaller, e.g. depending on channel and/or procedure. In some cases, operation may be based on an OFDM waveform or a SC-FDM waveform (e.g., downlink and/or uplink), in particular a FDF-SC-FDM-based waveform. However, operation based on a single carrier waveform, e.g. SC-FDE (which may be pulse-shaped or Frequency Domain Filtered, e.g. based on modulation scheme and/or MCS), may be considered for downlink and/or uplink. In general, different waveforms may be used for different communication directions. Communicating using or utilising a carrier and/or beam may correspond to operating using or utilising the carrier and/or beam, and/or may comprise transmitting on the carrier and/or beam and/or receiving on the carrier and/or beam.

The approaches are particularly advantageously implemented in a $5^{th}$ or $6^{th}$ Generation (5G) telecommunication network or 5G radio access technology or network (RAT/RAN), in particular according to 3GPP ($3^{rd}$ Generation Partnership Project, a standardisation organization). A suitable RAN may in particular be a RAN according to NR, for example release 15 or later, or LTE Evolution. However, the approaches may also be used with other RAT, for example future 5.5G or 6G systems or IEEE based systems.

There is described a method of operating a radio node in a wireless communication network. The method comprises communicating based on a signaling structure. The signaling structure comprises a number R of long symbols and/or a number Nsym of regular symbols, wherein R and/or Nsym is based on the subcarrier spacing associated to the signaling structure and/or a cyclic prefix length of a long symbol and/or a cyclic prefix length of a regular symbol. Alternatively, or additionally, the signaling structure may comprise one or more symbols, wherein a cyclic prefix with a cyclic prefix length may be associated to each of the one or more symbols, wherein further the cyclic prefix length may be based on and/or be representable by and/or correspond to $$q = 144 \times \frac{N_{fft}}{2048} + b.$$

Nfft may correspond to a number of samples of a Fast Fourier Transformation used for processing the signaling structure, and b may be an integer. Alternatively, or additionally, the signaling structure may be as described in one of the variants described below.

A radio node for a wireless communication network is considered. The radio node is adapted for communicating based on a signaling structure. The signaling structure comprises a number R of long symbols and/or a number Nsym of regular symbols, wherein R and/or Nsym is based on the subcarrier spacing associated to the signaling structure and/or a cyclic prefix length of a long symbol and/or a cyclic prefix length of a regular symbol. Alternatively, or additionally, the signaling structure may comprise one or more symbols, wherein a cyclic prefix with a cyclic prefix length may be associated to each of the one or more symbols, wherein further the cyclic prefix length may be based on and/or be representable by and/or correspond to $$q = 144 \times \frac{N_{fft}}{2048} + b.$$

Nfft may correspond to a number of samples of a Fast Fourier Transformation used for processing the signaling structure, and b may be an integer. Alternatively, or additionally, the signaling structure may be as described in one of the variants described below.

R and/or Nsym being based on the subcarrier spacing may correspond to for different subcarrier spacings, different Rs and/or Nsym may be used. The position or location of the long symbol/s and/or regular symbols/s may be such that symbols and/or cyclic prefixes associated to different subcarrier spacings are aligned, e.g. mapped to the same starting moment in time domain. A subcarrier spacing may be associated to and/or represented by a numerology and/or a numerology indication or factor, e.g. a parameter μ. b may be an integer, which may be 1 or larger. A cyclic prefix length based on and/or representable by and/or corresponding to $$q = 144 \times \frac{N_{fft}}{2048} + b$$

may be a cyclic prefix length that is has q samples, or with a number of samples based on q, e.g. to be larger than q. The length may also be represented by a corresponding duration in time domain. A sample may correspond to a sample of a FFT used for processing the signaling structure, e.g. covering and/or including and/or consisting of one or more allocation unit/s or block symbol/s or slot/s and/or one half-subframe.

The approaches described allow adaptation of cyclic prefix length in particular to high frequency ranges and/or high subcarrier spacings. In particular, cyclic prefix lengths that are larger than a symbol length may be avoided.

In general, a symbol or symbol length may correspond to a symbol proper, before and/or without a cyclic prefix. A long symbol or regular symbol may comprise a symbol proper (or symbol part) and an extended cyclic prefix (for a long symbol) or a normal cyclic prefix (for a regular symbol), thus a specified type of symbol may be considered to comprise the mentioned two components; a non-specified symbol may refer to the symbol without prefix. A reference to a symbol may be generalized to an allocation unit, if a cyclic suffix like a prefix is assigned thereto. In general, the length and/or duration of an extended cyclic prefix may be larger than the length and/or duration of a normal cyclic prefix. To a communication (and/or to communicating) and/or a signaling structure there may be associated a numerology and/or subcarrier spacing, or vice versa. The subcarrier spacing and/or numerology may be associated to a symbol duration in time domain, e.g. a symbol interval in time domain. Communicating may generally comprise transmitting and/or receiving od signaling. Communicating based on a signaling structure may generally comprise transmitting and/or receiving signaling structured according to the signaling structure, e.g. according to a time domain arrangement prescribed by the signaling structure. A time domain extension of the signaling structure may correspond to a transmission timing structure.

A signaling structure may define a long symbol and/or normal symbol and/or the arrangement of one or more of such, e.g. in a larger time domain structure; within the structure, the same or different communication directions (or, in some cases, no communication at all) may be associated to different symbols, e.g. according to scheduling. Communicating based on the signaling structure may comprise processing information and/or signaling according to the signaling structure, e.g. mapping samples to symbols according to the signaling structure. Communicating may generally be based on one from a set of different subcarrier spacings and/or numerologies and/or symbol time durations. To at least two different elements of this set, different cyclic prefix lengths (e.g., different normal cyclic prefix lengths and/or different extended cyclic prefix lengths) and/or different Rs may be associated. Prefix lengths may differ by b; b may in some examples 1 or 2. Additionally, to some elements of the set there may be associated the same cyclic prefix length, e.g. with the same b, and/or the same R. R may be larger than 1 in same cases; in particular it may be 2, or an integer power of 2. R may be based on the subcarrier spacing and/or the length of a normal cyclic prefix and/or of an extended cyclic prefix. It may be considered that the length and/or duration in time domain of regular symbols is the same within a signaling structure, and/or that the length and/or duration of long symbols is the same within a signaling structure.

A signaling structure may generally comprise and/or represent one or more symbols, with associated cyclic prefixes. It may be considered that a signaling structure may represent a time domain interval, e.g. adapted to conform to and/or accommodate the one or more symbols, and/or structured accordingly.

It may be considered that the signaling structure corresponds to one symbol and an associated cyclic prefix (e.g., a long symbol or a regular symbol), or to a half-subframe. In the latter case, the signaling structure may indicate and/or prescribe the arrangement and/or location and/or order of symbols and/or type of symbols (e.g., long and/or regular) in the half-subframe. Thus, adaption to subcarrier spacings may be optimised, e.g. allowing optimised mapping and/or use of time domain resources.

In some variants, the signaling structure may include one long symbol, wherein the symbol length of the symbol part of the long symbol may be at least as long or longer than the cyclic prefix length, e.g. than the length of an extended cyclic prefix associated to the long symbol.

It may be considered that the cyclic prefix length may be represented by and/or correspond to a number of samples e.g. of an FFT. However, in some cases, it may be associated to a duration in time domain; the duration in time domain and number of samples may be associated to each other, e.g. based on, and/or mappable using, a time unit (like a basic time unit) and/or a subcarrier spacing.

It may be considered that the cyclic prefix length is based on the subcarrier spacing associated to signaling structure.

It may be considered that communicating may be based on an OFDM-based waveform. The cyclic prefix may be particularly suitable for such a waveform. An OFDM-based waveform may be a waveform using a plurality of subcarriers, to each of which a modulation symbol may be mapped, or a waveform based thereon, e.g. a DFT-s-OFDM or SC-FDM waveform, which may use an additional spreading, e.g. with a DFT.

It may be considered that a subcarrier spacing associated to the signaling structure may correspond to 960 kHz more, in particular to 1920 kHz or more. Such high subcarrier spacings may be particularly be used for high carrier frequencies, e.g. above 50 GHz, e.g. 52.6 GHz or higher, or 100 GHz or higher. This allows using large bandwidths for signaling.

In general, it may be considered that a ratio between cyclic prefix lengths for extended cyclic prefix and normal cyclic prefix may be dependent on subcarrier spacing. In some cases, a cyclic prefix length (e.g., for extended and/or normal cyclic prefix) may correspond to an odd number of samples, which may be larger than 144.

The radio node or wireless device may comprise, and/or be adapted to utilise, processing circuitry and/or radio circuitry, in particular a transmitter and/or transceiver and/or receiver, for processing and/or performing measurements and/or transmitting and/or receiving and/or communicating based on a signaling structure and/or cyclic prefix. The radio node may be implemented as wireless device, e.g. a terminal or user equipment. Alternatively, a radio node may be implemented as network node, e.g. a base station or IAB node or relay node.

There is also described a program product comprising instructions causing processing circuitry to control and/or perform a method as described herein. Moreover, a carrier medium arrangement carrying and/or storing a program product as described herein is considered. An information system comprising, and/or connected or connectable, to a radio node is also disclosed.

BRIEF DESCRIPTION OF THE DRAWINGS

The drawings are provided to illustrate concepts and approaches described herein, and are not intended to limit their scope. The drawings comprise.

DETAILED DESCRIPTION 5G is the fifth generation of cellular technology and was introduced in Release 15 of the 3GPP standard. It is designed to increase speed, reduce latency, and improve flexibility of wireless services. The 5G system (5GS) includes both a new radio access network (NG-RAN) which makes use of a new air interface called New Radio (NR), and a new core network (5GC). The initial release of 5G in Release 15 is optimized for mobile broadband (MBB) and ultra-reliable and low latency communication (URLLC).

Figure 1:
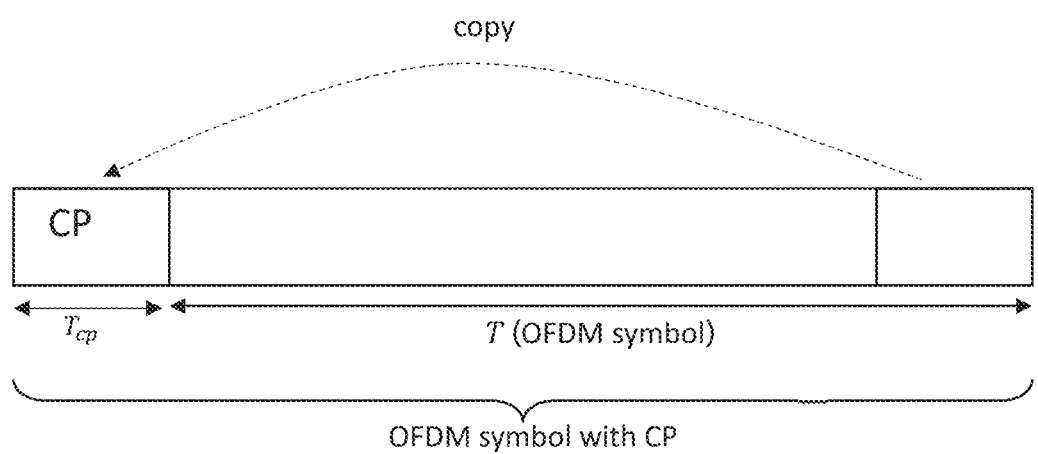
FIG. 1, showing a waveform with cyclic prefix.

NR employs the cyclic prefix (CP) orthogonal frequency-division multiplexing (OFDM) scheme in downlink and uplink and DFT spread OFDM (DFT-s-OFDM) in uplink. The CP provides a guard interval to reduce inter-symbol interference from the previous symbols, thus improving the link reliability in multipath environments. Specifically, CP is created by replicating samples from the end of each OFDM symbol to the front of the symbol. In this way, the linear convolution of a frequency-selective multipath channel can be modeled as a circular convolution and subsequently transformed to the frequency domain via a discrete Fourier transform (DFT). The CP insertion also enables using a simple channel estimation and equalization. FIG. 1 shows an exemplary signaling structure for one OFDM symbol, with the CP with a duration of Tcp for an OFDM symbol with a duration of T (for the symbol proper; the total symbol duration is Tcp+T, e.g., for a regular symbol or long symbol).

NR supports a flexible OFDM numerology which makes it suitable for a wide range of frequencies and deployment scenarios. The subcarrier spacing (SCS) is scalable by 15 [kHz]×2µ, where $\mu \in \{0, 1, 2, \ldots\}$. The slot length (and symbol duration) decreases by increasing the SCS. In NR, each slot with normal CP consists of 14 OFDM symbols and each subframe has a duration of 1 ms. Therefore, the number of slots within a subframe is a function of the SCS.

CP length in terms of the number of samples may be determined based on the following formula:

$$N_{CP,l}^{\mu} = \begin{cases} 512\kappa \cdot 2^{-\mu} & \text{extended cyclic prefix} \\ 144\kappa \cdot 2^{-\mu} + 16\kappa & \text{normal cyclic prefix, } l = 0 \text{ or } l = 7 \cdot 2^{\mu} \\ 144\kappa \cdot 2^{-\mu} & \text{normal cyclic prefix, } l \neq 0 \text{ and } l \neq 7 \cdot 2^{\mu} \end{cases} \quad (1)$$

where the basic time unit for NR is $T_c = 1/(\Delta f_{max} \cdot N_f)$, $\Delta f_{max} = 480 \cdot 10^3$ Hz (the maximum SCS defined in NR), and $N_f = 4096$. The constant $K = T_s/T_c = 64$ where $T_s = 1/(\Delta f_{ref} \cdot N_{f,ref})$ is the basic time unit in LTE, $\Delta f_{ref} = 15 \cdot 10^3$ Hz, and $N_{f,ref} = 2048$. The CP duration is given by $N_{CP,l}^{\mu} T_c$.

Also, the number of samples (e.g., for a FFT for transmission or reception) in one OFDM symbol (without CP) is given by $N_u^{\mu} = 2048K \cdot 2^{-\mu}$. Similarly, the symbol duration is equal to $N_u^{\mu} T_c$.

As can be seen from (1), within each 0.5 ms (corresponding to a half subframe), the first symbol has a larger CP length and thus it is longer than other symbols. Hereinafter, these relatively longer symbols (in each 0.5 ms duration) are referred to as long symbols.

In order to properly employ CP in the OFDM systems, the length of OFDM symbol (without CP) needs to be larger than the CP length, corresponding to $N_u^{\mu} > N_{CP,l}^{\mu}$.

Table 1 shows the OFDM symbol duration for different SCSs.

TABLE 1

| OFDM symbol duration and normal cyclic prefix for different SCSs. | | | | | |
|---|---|---|---|---|---|
| Numerology factor (µ) | 0 | 1 | 2 | 3 | 4 |
| Subcarrier spacing (kHz) | 15 | 30 | 60 | 120 | 240 |
| OFDM symbol duration (µs) | 66.67 | 33.33 | 16.67 | 8.33 | 4.17 |
| CP duration (µs) | 4.69 | 2.34 | 1.17 | 0.57 | 0.29 |
| Symbol duration including CP for regular symbols (µs) | 71.35 | 35.68 | 17.84 | 8.92 | 4.46 |
| CP duration for long symbols (µs) | 5.2 | 2.86 | 1.69 | 1.11 | 0.81 |
| Symbol duration including CP for long symbols (µs) | 71.87 | 36.19 | 18.36 | 9.44 | 4.99 |

Figure 2:
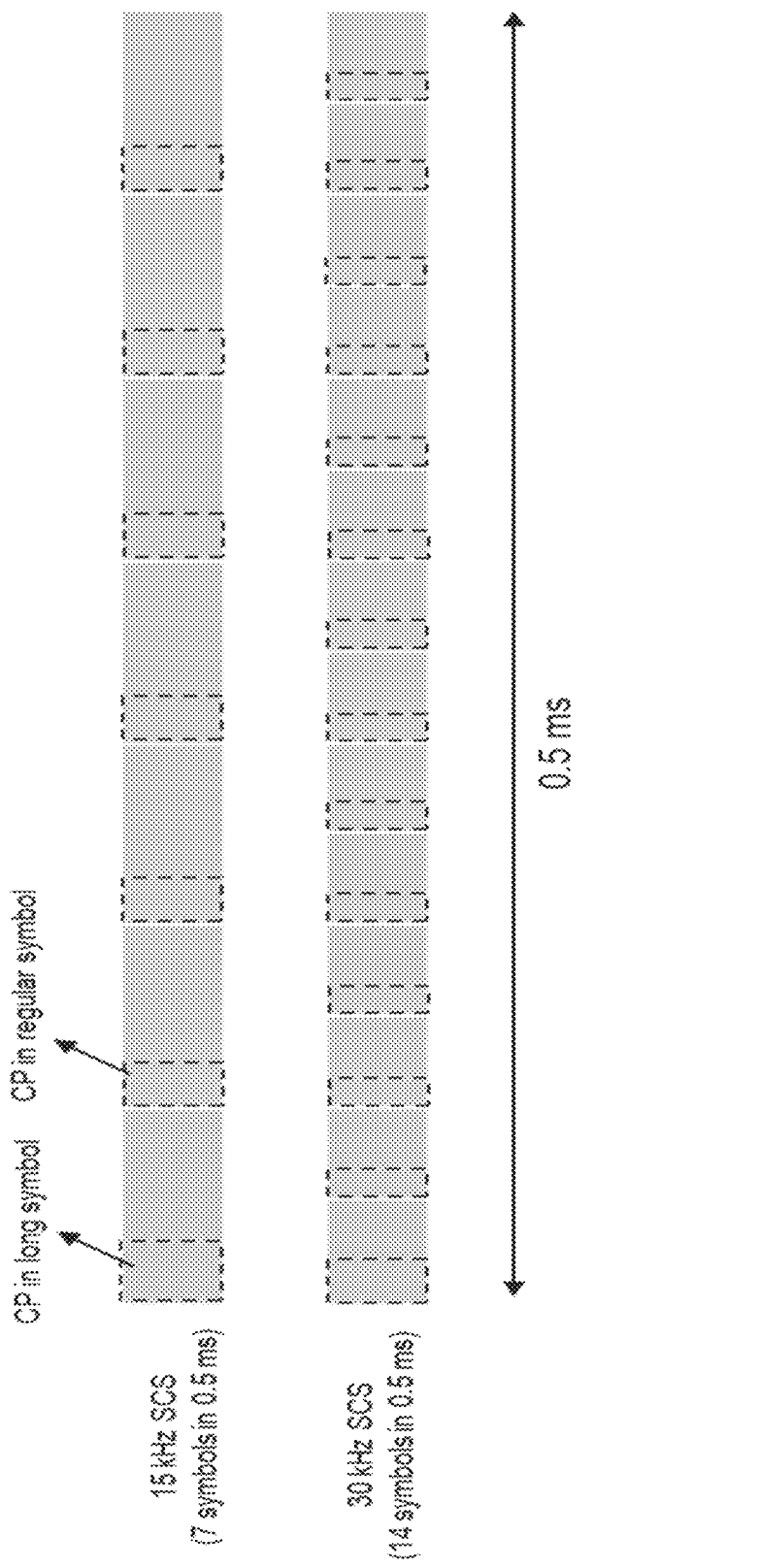
FIG. 2, showing an exemplary signaling structure.

Note that CP design ensures that symbols for different SCS values are aligned with each other. Such alignment is also beneficial in coexistence scenarios including the NR-LTE coexistence. For example, FIG. 2 shows exemplary signaling structures for 15 kHz and 30 kHz SCS cases, with the symbols aligned, in particular the starts of the cyclic prefixes of symbols are aligned.

The frequency range beyond 57.6 GHz provides a large amount of spectrum, and a system bandwidth of larger than the currently supported 400 MHz can be envisioned. To optimize NR operations for different deployment and use cases in this frequency range, the SCS needs to be increased. Large SCS values are beneficial in terms of handling phase noise and covering system bandwidth with reasonable FFT size. In the Rel-17 study on NR operations in 52.6 to 71 GHz, SCS 120 kHz, 240 kHz, 480 kHz, 960 kHz, and 1920 kHz are agreed for link-level simulation evolution. For frequency range beyond 71 GHz, which is one the major 5G evolution and 6G candidates, SCS larger than 1920 kHz can also be envisioned. In addition, Terahertz communications (0.3-10 THz) are envisioned as key enabling wireless technologies to satisfy the potential demand for Terabit-per-second (Tbps) links in the beyond 5G and 6G. The motivation for using these bands is that there is a vast amount of bandwidth available in these frequencies, which allows supporting new use cases such as imaging and spectroscopy. It also is likely that large subcarrier spacings (beyond 1920 kHz) are considered in THz communications.

With high SCS, some new issues may arise, e.g. in the context of cyclic prefixes. For example, according to equation (1), for the extended CP and normal CP with l≠0 and l≠7·2^µ, we have $N_u^{\mu} > N_{CP,l}^{\mu}$. However, depending on the SCS, this condition may not be satisfied for long symbols (normal CP with l=0 or l=7·2^µ).

For example, for $N_u^{\mu} > N_{CP,l}^{\mu}$, then $2048K \cdot 2^{-\mu} > 144K \cdot 2^{-\mu} + 16K$ Accordingly, $2^{\mu} < 119 \rightarrow \mu \leq 6$ Therefore, for µ≥7, corresponding to SCS>1920 kHz, the CP length for long symbols is larger than the length of the OFDM symbol (without CP). Table 2 shows the CP durations and symbol durations for SCS values 1920 kHz, 3840 kHz, 7680 kHz, and 15360 kHz. As we can see, in the long symbols the CP duration exceeds the symbol duration. This clearly contravenes the functionality of the CP, and represents significant overhead. Consequently, a new CP design is needed for supporting large SCSs in high-frequency operations. Table 2 shows the CPs for long symbols according to the common approach.

TABLE 2

CP and symbol duration for long symbols for high SCSs.

| Numerology factor (μ) | 7 | 8 | 9 | 10 |
|---|---|---|---|---|
| Subcarrier spacing (kHz) | 1920 | 3840 | 7680 | 15360 |
| Long symbol duration (μs) | 0.52 | 0.26 | 0.13 | 0.065 |
| CP duration for long symbols (μs) | 0.557 | 0.539 | 0.53 | 0.525 |
| Ratio of CP to symbol duration | 1.07 | 2.07 | 4.07 | 8.07 |

Approaches for signaling structures pertaining to the CP length in OFDM-based systems are described. The approaches are generic and can be applied to various scenarios. Improved utilisation of CP when operating in high frequencies and large subcarrier spacings is facilitated. In particular, (i) increasing CP length for regular symbols and/or (ii) using multiple long symbols are considered. The proposed solutions also ensure that symbols are aligned between different SCSs. The proposed solutions enable an efficient CP design in OFDM systems.

A generalised procedure for finding the CP length is proposed, in particular for OFDM or OFDM based systems (e.g., SC-FDM may be considered an OFDM based system).

The following notations and definitions may be used:
S: subcarrier spacing in kHz,
$N_{fft}$: FFT size which determines the number of samples in each OFDM symbol (excluding CP).
L: number of samples in a 0.5 ms duration
$f_s$: sampling rate which is equal to $N_{fft} \times S$
$T_{sm}=1/f_s$: sampling time
$N_{sym}$: number of OFDM symbols within a half-subframe (i.e., 0.5 ms duration).
Long symbol: An OFDM symbol with a longer CP compared to other symbols. In NR, this is the first OFDM symbol in each half-subframe (i.e., 0.5 ms duration).
Regular symbols: OFDM symbols other than the long symbols in each half-subframe.
x: number of CP samples in the first OFDM symbol in each half-subframe (i.e., 0.5 ms duration). This is the CP length for the first symbol (i.e., long symbol).
q: number of CP samples in each regular symbol within a half-subframe (i.e., 0.5 ms duration). This is the CP length for each regular symbol.

Figure 3:
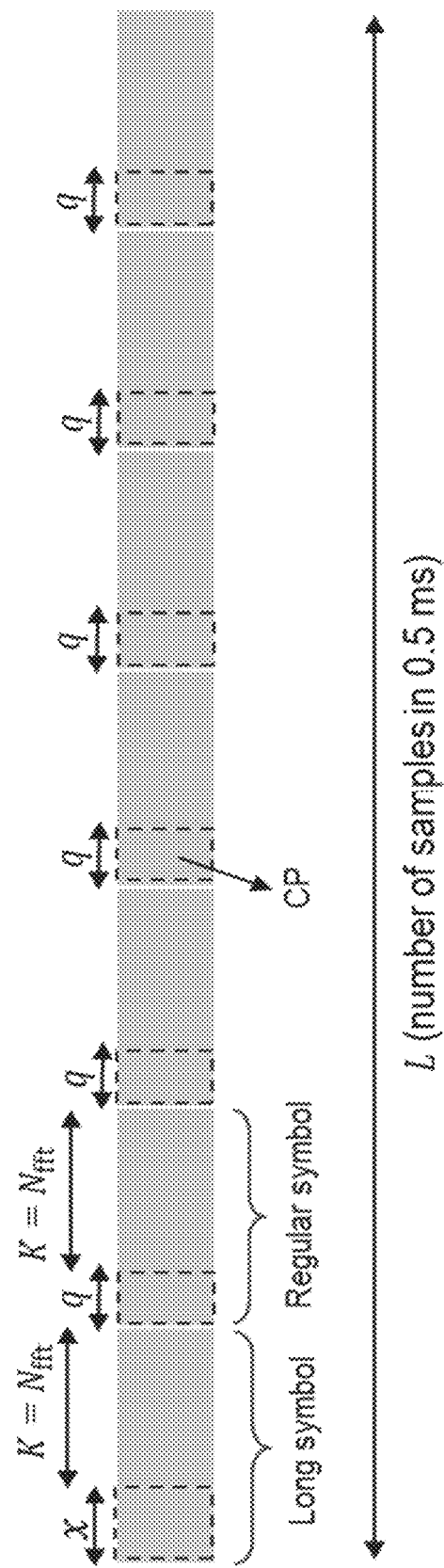
FIG. 3, showing another exemplary signaling structure.

The values of cyclic prefix (q and x) are set to be suitable for different deployment scenarios. The aforementioned parameters are also illustrated in FIG. 3.

Suitable values for x and q are proposed.

The number of samples within a 0.5 ms half-subframe is given by:

$$L=0.5 \times N_{fft} \times S$$

In general, the number of symbols ($N_{sym}$) can be arbitrary. In NR, the number of symbols within the half-subframe is 7 for 15 kHz SCS. For a SCS S, the number of symbols within the half-subframe is $N_{sym}=7S/15$. Following the NR framework, $N_{sym}=7S/15$ is considered as baseline. However, similar analysis applies for arbitrary values of $N_{sym}$.

Considering one long symbol within a 0.5 ms half-subframe (similar to NR with normal CP), the total number of samples per half-subframe can be expressed by:

$$L=N_{sym}N_{fft}+q(N_{sym}-1)+x=0.5 \times N_{fft} \times S$$

which can be reduced to:

$$x = \left(\frac{S}{2} - N_{sym}\right)N_{fft} - (N_{sym}-1)q$$

For $N_{sym}=7S/15$, we have $$x = \frac{S}{15}\left[\frac{N_{fft}}{2} - 7q\right] + q$$

For SCS of $S=15 [kHz] \times 2^\mu$, $$x = 2^\mu\left[\frac{N_{fft}}{2} - 7q\right] + q$$

Using LTE as example:

15 kHz $SCS(\mu=0), N_{fft}=2048, K=N_{fft}=2048, q=144, x=160$

Sampling time $$T_{sm} = \frac{1}{N_{fft} \times S} = \frac{1}{2048 \times 15 \times 10^3}$$

CP durations
Long symbol=$x \times T_{sm}$, =5.2 μs;
Regular symbol=$q \times T_{sm}$, =4.69 μs
For NR as baseline example:

$2^\mu \times 15[kHz] SCS, N_{fft} = 4096, K = 4096,$ $$q = 144 \times \frac{4096}{2048} = 288, x = (2^\mu \times 32) + 288$$

Note: in general, $$q = 144 \times \frac{N_{fft}}{2048}$$

may hold
Sampling time $$T_{sm} = \frac{1}{N_{fft} \times S} = \frac{1}{4096 \times 2^\mu \times 15 \times 10^3}$$

CP duration
Long symbol=$x \times T_{sm}$
Regular symbol=$q \times T_{sm}$

As can be seen, for μ≥7, x>K, such that the CP length for the long symbol exceeds the symbol length.

It may be considered to use an approach according to which, compared to the examples, the CP length for the long symbols is reduced and the CP length for regular symbols is increased. In an alternative view, the ratio between CP lengths for regular and long symbols may adjusted, e.g. to be different between high frequency ranges and/or high SCS, and low frequency ranges and/or low SCS. In general, high SCS may correspond to SCS of 900 kHz, or more, in particular 960 kHZ or 1920 kHz, or more, and/or to a numerology factor or 6 or 7 or higher.

A new parameter b≥0 (b is integer) to increase the CP length for regular symbols may be considered. The CP length for a regular symbol may become:

$$q = 144 \times \frac{N_{fft}}{2048} + b$$

The CP length for a long symbol may be given by:

$$x = 2^\mu \left[\frac{N_{fft}}{2} - 7q\right] + q = 2^\mu \left[\frac{N_{fft}}{2} - \frac{1008 N_{fft}}{2048} - 7b\right] + \frac{144 N_{fft}}{2048} + b$$

To ensure that the CP length for the long symbol does not exceed the symbol length, the following condition needs to be satisfied:

$$2^\mu \left[\frac{N_{fft}}{2} - \frac{1008 N_{fft}}{2048} - 7b\right] + \frac{144 N_{fft}}{2048} + b < N_{fft}$$

Subsequently, a minimum value of b may be given by:

$$b_{min} = \left\lceil \frac{N_{fft}}{2048} \left( \frac{2^{\mu+10} - 1008 \times 2^\mu - 1904}{7 \times 2^\mu - 1} \right) \right\rceil$$

where $\lceil . \rceil$ is the ceiling function.

Moreover, to achieve symbol alignment between different SCSs, the same value of b needs to be considered for all SCSs. Therefore, $b_{min}$ can be determined based on the maximum supported SCS. More specifically, let $2^{\mu_{max}} \times 15$ [kHz] be the maximum SCS supported in the system. Then the CP lengths for the regular and long OFDM symbols may be given by:

$$q = 144 \times \frac{N_{fft}}{2048} + b, \quad (2)$$

$$b \geq b_{min} = \left\lceil \frac{N_{fft}}{2048} \left( \frac{2^{\mu_{max}+10} - 1008 \times 2^{\mu_{max}} - 1904}{7 \times 2^{\mu_{max}} - 1} \right) \right\rceil. \quad (3)$$

$$x = 2^\mu \left[\frac{N_{fft}}{2} - 7q\right] + q, \quad (4)$$

In addition, the CP for a long symbol should not shorter than the Cp for a regular symbol:

$$x \geq q$$

which leads to:

$$b \leq \frac{N_{fft}}{896}, \quad (5)$$

Hence, $$b_{max} = \left\lfloor \frac{N_{fft}}{896} \right\rfloor. \quad (6)$$

(the floor function is used for this equation)

For example, $b_{max}$ for FFT sizes 2048 and 4096 are 2 and 4, respectively. In another embodiment, the CP lengths for the regular and long OFDM symbols are determined according to one or multiple equations in (2)-(6).

Some illustrative results for FFT sizes 2048 and 4096 are provided. As an example, consider the case with the maximum supported SCS 1920 kHz and $N_{fft}$=2048 in Tables 3-4. In this case, the CP length for each regular symbol can be 145 or 146 samples. For the regular symbol CP length of 145, the CP length for the long symbol is {154,163, 181, 217, 289, 433, 721,1297} samples for SCSs {15, 30, 60, 120, 240, 480, 960, 1920} kHz, respectively.

TABLE 3

CP length for $N_{fft}$ = 2048.

| Maximum supported SCS | b ≥ $b_{min}$ | CP length for a regular symbol (q) | CP length for a long symbol for different SCSs (μ = 0 to $\mu_{max}$) |
|---|---|---|---|
| $\mu_{max}$ = 6, SCS = 960 kHz | 0 | 144 | 160, 176, 208, 272, 400, 656, 1168 |
| | 1 | 145 | 154, 163, 181, 217, 289, 433, 721, 1297 |
| | 2 | 146 | 148, 150, 154, 162, 178, 210, 274, 402, 658, 1170 |
| $\mu_{max}$ = 7, SCS = 1920 kHz | 1 | 145 | 154, 163, 181, 217, 289, 433, 721, 1297 |
| | 2 | 146 | 148, 150, 154, 162, 178, 210, 274, 402, 658 |
| $\mu_{max}$ = 8, SCS = 3840 kHz | 2 | 146 | 148, 150, 154, 162, 178, 210, 274, 402, 658 |
| $\mu_{max}$ = 9, SCS = 7680 kHz | 2 | 146 | 148, 150, 154, 162, 178, 210, 274, 402, 658, 1170 |

TABLE 4

CP length for $N_{fft}$ = 4096.

| Maximum supported SCS | b ≥ $b_{min}$ | CP length for a regular symbol (q) | CP length for a long symbol for different SCSs (μ = 0 to $\mu_{max}$) |
|---|---|---|---|
| $\mu_{max}$ = 6, SCS = 960 kHz | 0 | 288 | 320, 352, 416, 544, 800, 1312, 2336 |
| | 1 | 289 | 314, 339, 389, 489, 689, 1089, 1889, 3489 |
| | 2 | 290 | 308, 326, 362, 434, 578, 866, 1442, 2594 |
| | 3 | 291 | 335, 379, 467, 643, 995, 1699, 3107 |
| | 4 | 292 | 296, 300, 308, 324, 356, 420, 548, 804, 1316, 2340 |
| $\mu_{max}$ = 7, SCS = 1920 kHz | 1 | 289 | 314, 339, 389, 489, 689, 1089, 1889, 3489 |
| | 2 | 290 | 308, 326, 362, 434, 578, 866, 1442, 2594 |
| | 3 | 291 | 335, 379, 467, 643, 995, 1699, 3107 |
| | 4 | 292 | 296, 300, 308, 324, 356, 420, 548, 804, 1316, 2340 |
| $\mu_{max}$ = 8, SCS = 3840 kHz | 3 | 291 | 335, 379, 467, 643, 995, 1699, 3107 |
| | 4 | 292 | 296, 300, 308, 324, 356, 420, 548, 804, 1316, 2340 |

TABLE 4-continued

CP length for $N_{fft} = 4096$.

| Maximum supported SCS | $b \geq b_{min}$ | CP length for a regular symbol (q) | CP length for a long symbol for different SCSs ($\mu = 0$ to $\mu_{max}$) |
|---|---|---|---|
| $\mu_{max} = 9$, SCS = 7680 kHz | 4 | 292 | 296, 300, 308, 324, 356, 420, 548, 804, 1316, 2340 |

It should be noted that the CP length can be also presented in terms of basic time unit of the system. In this case, the presented CP lengths are scaled based on the basic time unit of the system.

A signaling structure with a CP design with multiple long symbols is proposed, e.g. additionally or alternatively. Multiple long symbols may be considered within each half-subframe. Specifically, within each 0.5 ms half-subframe, there can be R>1 long symbols. Therefore, among $N_{sym}$ symbols within a 0.5 ms, there are R long symbols and ($N_{sym}$−R) regular symbols.

$$L = N_{sym}N_{fft} + q(N_{sym}-R) + Rx = 0.5 \times N_{fft} \times S$$

Solving for x, $$x = \frac{N_{fft}(S/2 - N_{sym}) - q(N_{sym} - R)}{R}$$

Considering $$S = 15[\text{kHz}] \times 2^\mu, N_{sym} = 7S/15 = 7 \times 2^\mu,$$

$$\text{and } q = 144 \times \frac{N_{fft}}{2048}; x = \frac{2048 \times 2^{\mu-1} - 144 \times (7 \times 2^\mu - R)}{2048R} \times N_{fft}$$

which reduces to $$x = \left(\frac{2^{\mu+4}}{R} + 144\right) \times \frac{N_{fft}}{2048}$$

To ensure that the CP length for the long symbol does not exceed the symbol length, the following condition needs to be satisfied:

$$x < N_{fft},$$

Thus:

$$R > \frac{2^{\mu+4}}{1904}$$

Moreover, to ensure the symbol alignment between different SCSs, the same value of R needs to be considered for all supported SCSs. Therefore, R can be determined based on the maximum supported SCS. More specifically, let $2^{\mu_{max}} \times 15$ [kHz] be the maximum SCS supported in the system. Then the number of long symbols within a 0.5 ms should be:

$$R \geq \left\lceil \frac{2^{\mu_{max}+4}}{1904} \right\rceil.$$

Also, the number of long symbols cannot exceed the total number of symbols:

$$R \leq N_{sym} = 7 \times 2^\mu$$

If the same number of long symbols needs to be considered for all supported SCSs, the maximum value of R should be determined based on the minimum supported SCS in the system:

$$R < 7 \times 2^{\mu_{min}}$$

where the minimum supported SCS in the system is $2^{\mu_{min}} \times 15$ [kHz].

From the above analysis, we have $$2^{\mu_{max}-6} \leq R < 7 \times 2^{\mu_{min}}.$$

In a first variant, the number of long symbols is a power of 2, e.g. an integer power of 2. Another condition for selecting R may pertain to an integer value of x. This condition can be satisfied by considering $R = 2^p$ where the range of p is determined based on $\mu_{max}$.

In one variant, the number of long symbols within 0.5 ms may be $R = 2^p$ where the range of p is determined based on $\mu_{max}$.

It can be observed that:

$$2^{\mu_{max}-7} < \frac{2^{\mu_{max}+4}}{1904} < 2^{\mu_{max}-6}$$

In a variant, the number of long symbols within 0.5 ms is $R = 2^{(\mu_{max}-6)}$, where $2^{\mu_{max}} \times 15$ [kHz] is the maximum supported SCS in the system.

Let the maximum and minimum SCSs supported in the system be $2^{\mu_{max}} \times 15$ [kHz] and $2^{\mu_{min}} \times 15$ [kHz], respectively. Then the number of long symbols within a 0.5 ms is:

$$R = 2^p$$

$$(\mu_{max}-6) \leq p \leq (\mu_{min}+2)$$

Therefore, within 0.5 ms, the minimum number of long symbols may be $2^{(\mu_{max}-6)}$, and the maximum number of long symbols may be $(2^{(\mu_{min}+2)})$. It should be noted that the minimum and maximum supported SCSs can refer to the SCSs for which symbol alignment is required.

In general, the long symbols can be placed in different locations within each slot 0.5 ms. More specifically, one or more of the following may be considered:

Each long symbol is located before a regular symbol;
One or multiple long symbols are located at the beginning of each 0.5 ms;
One or multiple long symbols are located at the beginning of one or multiple slots (or allocation units) within each 0.5 ms;
One or multiple long symbols can be used for control channels, e.g. to improve the coverage. For example, a coreset and/or search space may be associated to one or more long symbols.

Some illustrative results for FFT sizes 2048 and 4096 are provided. As an example, a case with the maximum supported SCS 3840 kHz, and minimum SCS 15 kHz with $N_{fft}=2048$ in Table 5 may be considered. In this case, there need to be at least 4 long symbols within each 0.5 ms. The CP length for each long symbol is {148, 152, 160, 176, 208, 272, 400, 656, 1168} samples for SCSs {15, 30, 60, 120, 240, 480, 960, 1920, 3840} kHz, respectively. The CP length for the regular symbols is 144. Tables 5 to 10 show some examples.

TABLE 5

CP lengths for $N_{fft} = 2048$, $\mu_{min} = 0$.

| Maximum and minimum supported SCS | Minimum number of long symbols | CP lengths for a long symbol (x) for different SCSs ($\mu = \mu_{min}$ to $\mu_{max}$) | CP length for a regular symbol (q) |
|---|---|---|---|
| $\mu_{max} = 7$, (SCS = 1920 kHz), $\mu_{min} = 0$, (SCS = 15 kHz) | 2 | 152, 160, 176, 208, 272, 400, 656, 1168 | 144 |
| $\mu_{max} = 8$, (SCS = 3840 kHz), $\mu_{min} = 0$, (SCS = 15 kHz) | 4 | 148, 152, 160, 176, 208, 272, 400, 656, 1168 | 144 |

TABLE 6

CP lengths for $N_{fft} = 2048$, $\mu_{min} = 1$.

| Maximum and minimum supported SCS | Minimum number of long symbols | CP lengths for a long symbol (x) for different SCSs ($\mu = \mu_{min}$ to $\mu_{max}$) | CP length for a regular symbol (q) |
|---|---|---|---|
| $\mu_{max} = 9$, (SCS = 7680 kHz), $\mu_{min} = 1$, (SCS = 30 kHz) | 8 | 146, 148, 152, 160, 176, 208, 272, 400, 656, 1168 | 144 |

TABLE 7

CP lengths for $N_{fft} = 2048$, $\mu_{min} = 2$.

| Maximum and minimum supported SCS | Minimum number of long symbols | CP lengths for a long symbol (x) for different SCSs ($\mu = \mu_{min}$ to $\mu_{max}$) | CP length for a regular symbol (q) |
|---|---|---|---|
| $\mu_{max} = 10$, (SCS = 15360 kHz), $\mu_{min} = 2$, (SCS = 60 kHz) | 16 | 145, 146, 148, 152, 160, 176, 208, 272, 400, 656, 1168 | 144 |

TABLE 8

CP lengths for $N_{fft} = 4096$, $\mu_{min} = 0$.

| Maximum and minimum supported SCS | Minimum number of long symbols | CP lengths for a long symbol (x) for different SCSs ($\mu = \mu_{min}$ to $\mu_{max}$) | CP length for a regular symbol (q) |
|---|---|---|---|
| $\mu_{max} = 7$, (SCS = 1920 kHz), $\mu_{min} = 0$, (SCS = 15 kHz) | 2 | 304, 320, 352, 416, 544, 800, 1312, 2336 | 288 |
| $\mu_{max} = 8$, (SCS = 3840 kHz), $\mu_{min} = 0$, (SCS = 15 kHz) | 4 | 296, 304, 320, 352, 416, 544, 800, 1312, 2336 | 288 |

TABLE 9

CP lengths for $N_{fft} = 4096$, $\mu_{min} = 1$.

| Maximum and minimum supported SCS | Minimum number of long symbols | CP lengths for a long symbol (x) for different SCSs ($\mu = \mu_{min}$ to $\mu_{max}$) | CP length for a regular symbol (q) |
|---|---|---|---|
| $\mu_{max} = 9$, (SCS = 7680 kHz), $\mu_{min} = 1$, (SCS = 30 kHz) | 8 | 292, 296, 304, 320, 352, 416, 544, 800, 1312, 2336 | 288 |

TABLE 10

CP lengths for $N_{fft} = 4096$, $\mu_{min} = 2$.

| Maximum and minimum supported SCS | Minimum number of long symbols ($R_{min}$) | CP lengths for a long symbol (x) for different SCSs ($\mu = \mu_{min}$ to $\mu_{max}$) | CP length for a regular symbol (q) |
|---|---|---|---|
| $\mu_{max} = 10$, (SCS = 15360 kHz), $\mu_{min} = 2$, (SCS = 60 kHz) | 16 | 290, 292, 296, 304, 320, 352, 416, 544, 800, 1312, 2336 | 288 |

The CP length can be also presented in terms of basic time unit of the system. In this case, the presented CP lengths are scaled based on the basic time unit of the system.

A combination of the proposed CP design schemes may be considered. For example, a CP length for regular symbols may be increased, and multiple long symbols may be considered within a 0.5 ms half-subframe.

More alternatively, or additionally, it may be considered including additional regular symbols, as long as CP of each symbol is sufficiently long. For example, it may be assumed that within each 0.5 ms, there are one long symbol with CP of length x and ($N_{sym}-1$) regular symbols with CP of length q. As many regular symbols as possible may be included, so long as x≥q. Specifically, there may hold $$L = N_{sym} N_{fft} + q(N_{sym}-1) + x = 0.5 \times N_{fft} \times S$$

$$x = N_{fft}(S/2 - N_{sym}) - q(N_{sym}-1) \geq q$$

It follows that $$N_{sym} \leq \frac{N_{fft} S}{2(N_{fft} + q)}$$

Hence, the maximum number of symbols per half-subframe is $$N_{sym}^{max} = \left\lfloor \frac{N_{fft} S}{2(N_{fft} + q)} \right\rfloor$$

Considering $$S = 15[\text{kHz}] \times 2^\mu \text{ and } q = 144 \times \frac{N_{fft}}{2048}, N_{sym}^{max} \left\lfloor \frac{15 \times 2^\mu}{2\left(1 + \frac{144}{2048}\right)} \right\rfloor = \left\lfloor \frac{15 \times 2^{\mu+6}}{137} \right\rfloor.$$

For example, as shown in Table 11, for SCS=3840 kHz and SCS=7680 kHz, 1 and 3 additional regular symbols (compared to the baseline example) can be included per half-subframe, respectively. In a variant, the symbol boundaries may be aligned in different SCSs by placing these extra regular symbols immediately after the long symbol.

TABLE 11

Number of symbols per half-subframe.

| Maximum supported SCS | $N_{sym} = 7 \cdot 2^{\mu}$ | $N_{sym}^{max} = \left\lfloor \frac{15 \times 2^{\mu+6}}{137} \right\rfloor$ |
|---|---|---|
| $\mu_{max} = 6$, SCS = 960 kHz | 448 | 448 |
| $\mu_{max} = 7$, SCS = 1920 kHz | 896 | 896 |
| $\mu_{max} = 8$, SCS = 3840 KHz | 1792 | 1793 |
| $\mu_{max} = 9$, SCS = 7680 kHz | 3584 | 3587 |

There are generally proposed solutions for an efficient CP design suitable for various scenarios. Solutions are particularly suited for operating with large SCSs in high frequencies, e.g. in 5G or 6G RATs.

Figure 4:
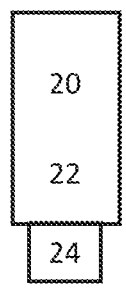
FIG. 4, showing an exemplary radio node like a terminal.

FIG. 4 schematically shows a radio node, in particular a wireless device or terminal 10 or a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication (which may be within coverage of the cellular network, or out of coverage; and/or may be considered non-cellular communication and/or be associated to a non-cellular wireless communication network). Radio node 10 may generally be adapted to carry out any of the methods of operating a radio node like terminal or UE disclosed herein; in particular, it may comprise corresponding circuitry, e.g. processing circuitry, and/or modules, e.g. software modules. It may be considered that the radio node 10 comprises, and/or is connected or connectable, to a power supply.

Figure 5:
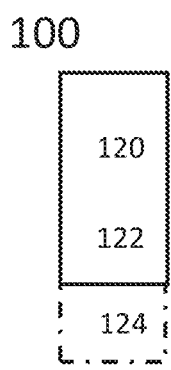
FIG. 5, showing another exemplary radio node like a network node.

FIG. 5 schematically show a (signaling) radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

In general, a block symbol may represent and/or correspond to an extension in time domain, e.g. a time interval. A block symbol duration (the length of the time interval) may correspond to the duration of an OFDM symbol or a corresponding duration, and/or may be based and/or defined by a subcarrier spacing used (e.g., based on the numerology) or equivalent, and/or may correspond to the duration of a modulation symbol (e.g., for OFDM or similar frequency domain multiplexed types of signaling). It may be considered that a block symbol comprises a plurality of modulation symbols, e.g. based on a subcarrier spacing and/or numerology or equivalent, in particular for time domain multiplexed types (on the symbol level for a single transmitter) of signaling like single-carrier based signaling, e.g. SC-FDE or SC-FDMA (in particular, FDF-SC-FDMA or pulse-shaped SC-FDMA). The number of symbols may be based on and/or defined by the number of subcarrier to be DFTS-spread (for SC-FDMA) and/or be based on a number of FFT samples, e.g. for spreading and/or mapping, and/or equivalent, and/or may be predefined and/or configured or configurable. A block symbol in this context may comprise and/or contain a plurality of individual modulation symbols, which may be for example 1000 or more, or 3000 or more, or 3300 or more. The number of modulation symbols in a block symbol may be based and/or be dependent on a bandwidth scheduled for transmission of signaling in the block symbol. A block symbol and/or a number of block symbols (an integer smaller than 20, e.g. equal to or smaller than 14 or 7 or 4 or 2 or a flexible number) may be a unit (e.g., allocation unit) used or usable or intended e.g. for scheduling and/or allocation of resources, in particular in time domain. To a block symbol (e.g., scheduled or allocated) and/or block symbol group and/or allocation unit, there may be associated a frequency range and/or frequency domain allocation and/or bandwidth allocated for transmission.

An allocation unit, and/or a block symbol, may be associated to a specific (e.g., physical) channel and/or specific type of signaling, for example reference signaling. In some cases, there may be a block symbol associated to a channel that also is associated to a form of reference signaling and/or pilot signaling and/or tracking signaling associated to the channel, for example for timing purposes and/or decoding purposes (such signaling may comprise a low number of modulation symbols and/or resource elements of a block symbol, e.g. less than 10% or less than 5% or less than 1% of the modulation symbols and/or resource elements in a block symbol). To a block symbol, there may be associated resource elements; a resource element may be represented in time/frequency domain, e.g. by the smallest frequency unit carrying or mapped to (e.g., a subcarrier) in frequency domain and the duration of a modulation symbol in time domain. A block symbol may comprise, and/or to a block symbol may be associated, a structure allowing and/or comprising a number of modulation symbols, and/or association to one or more channels (and/or the structure may dependent on the channel the block symbol is associated to and/or is allocated or used for), and/or reference signaling (e.g., as discussed above), and/or one or more guard periods and/or transient periods, and/or one or more affixes (e.g., a prefix and/or suffix and/or one or more infixes (entered inside the block symbol)), in particular a cyclic prefix and/or suffix and/or infix. A cyclic affix may represent a repetition of signaling and/or modulation symbol/s used in the block symbol, with possible slight amendments to the signaling structure of the affix to provide a smooth and/or continuous and/or differentiable connection between affix signaling and signaling of modulation symbols associated to the content of the block symbol (e.g., channel and/or reference signaling structure). In some cases, in particular some OFDM-based waveforms, an affix may be included into a modulation symbol. In other cases, e.g. some single carrier-based waveforms, an affix may be represented by a sequence of modulation symbols within the block symbol. It may be considered that in some cases a block symbol is defined and/or used in the context of the associated structure.

Communicating may comprise transmitting or receiving. It may be considered that communicating like transmitting signaling is based on a SC-FDM based waveform, and/or corresponds to a Frequency Domain Filtered (FDF) DFTS-OFDM waveform. However, the approaches may be applied to a Single Carrier based waveform, e.g. a SC-FDM or SC-FDE-waveform, which may be pulse-shaped/FDF-based. It should be noted that SC-FDM may be considered DFT-spread OFDM, such that SC-FDM and DFTS-OFDM may be used interchangeably. Alternatively, or additionally, the signaling (e.g., first signaling and/or second signaling) and/or beam/s (in particular, the first received beam and/or second received beam) may be based on a waveform with CP or comparable guard time. The received beam and the transmission beam of the first beam pair may have the same (or similar) or different angular and/or spatial extensions; the received beam and the transmission beam of the second beam pair may have the same (or similar) or different angular and/or spatial extensions. It may be considered that the received beam and/or transmission beam of the first and/or second beam pair have angular extension of 20 degrees or less, or 15 degrees or less, or 10 or 5 degrees or less, at least in one of horizontal or vertical direction, or both; different beams may have different angular extensions. An extended guard interval or switching protection interval may have a duration corresponding to essentially or at least N CP (cyclic prefix) durations or equivalent duration, wherein N may be 2, or 3 or 4. An equivalent to a CP duration may represent the CP duration associated to signaling with CP (e.g., SC-FDM-based or OFDM-based) for a waveform without CP with the same or similar symbol time duration as the signaling with CP. Pulse-shaping (and/or performing FDF for) a modulation symbol and/or signaling, e.g. associated to a first subcarrier or bandwidth, may comprise mapping the modulation symbol (and/or the sample associated to it after FFT) to an associated second subcarrier or part of the bandwidth, and/or applying a shaping operation regarding the power and/or amplitude and/or phase of the modulation symbol on the first subcarrier and the second subcarrier, wherein the shaping operation may be according to a shaping function. Pulse-shaping signaling may comprise pulse-shaping one or more symbols; pulse-shaped signaling may in general comprise at least one pulse-shaped symbol. Pulse-shaping may be performed based on a Nyquist-filter. It may be considered that pulse-shaping is performed based on periodically extending a frequency distribution of modulation symbols (and/or associated samples after FFT) over a first number of subcarrier to a larger, second number of subcarriers, wherein a subset of the first number of subcarriers from one end of the frequency distribution is appended at the other end of the first number of subcarriers.

In some variants, communicating may be based on a numerology (which may, e.g., be represented by and/or correspond to and/or indicate a subcarrier spacing and/or symbol time length) and/or an SC-FDM based waveform (including a FDF-DFTS-FDM based waveform) or a single-carrier based waveform. Whether to use pulse-shaping or FDF on a SC-FDM or SC-based waveform may depend on the modulation scheme (e.g., MCS) used. Such waveforms may utilise a cyclic prefix and/or benefit particularly from the described approaches. Communicating may comprise and/or be based on beamforming, e.g. transmission beamforming and/or reception beamforming, respectively. It may be considered that a beam is produced by performing analog beamforming to provide the beam, e.g. a beam corresponding to a reference beam. Thus, signaling may be adapted, e.g. based on movement of the communication partner. A beam may for example be produced by performing analog beamforming to provide a beam corresponding to a reference beam. This allows efficient postprocessing of a digitally formed beam, without requiring changes to a digital beamforming chain and/or without requiring changes to a standard defining beam forming precoders. In general, a beam may be produced by hybrid beamforming, and/or by digital beamforming, e.g. based on a precoder. This facilitates easy processing of beams, and/or limits the number of power amplifiers/ADC/DCA required for antenna arrangements. It may be considered that a beam is produced by hybrid beamforming, e.g. by analog beamforming performed on a beam representation or beam formed based on digital beamforming. Monitoring and/or performing cell search may be based on reception beamforming, e.g. analog or digital or hybrid reception beamforming. The numerology may determine the length of a symbol time interval and/or the duration of a cyclic prefix. The approaches described herein are particularly suitable to SC-FDM, to ensure orthogonality, in particular subcarrier orthogonality, in corresponding systems, but may be used for other waveforms. Communicating may comprise utilising a waveform with cyclic prefix. The cyclic prefix may be based on a numerology, and may help keeping signaling orthogonal. Communicating may comprise, and/or be based on performing cell search, e.g. for a wireless device or terminal, or may comprise transmitting cell identifying signaling and/or a selection indication, based on which a radio node receiving the selection indication may select a signaling bandwidth from a set of signaling bandwidths for performing cell search.

A beam or beam pair may in general be targeted at one radio node, or a group of radio nodes and/or an area including one or more radio nodes. In many cases, a beam or beam pair may be receiver-specific (e.g., UE-specific), such that only one radio node is served per beam/beam pair. A beam pair switch or switch of received beam (e.g., by using a different reception beam) and/or transmission beam may be performed at a border of a transmission timing structure, e.g. a slot border, or within a slot, for example between symbols Some tuning of radio circuitry, e.g. for receiving and/or transmitting, may be performed. Beam pair switching may comprise switching from a second received beam to a first received beam, and/or from a second transmission beam to a first transmission beam. Switching may comprise inserting a guard period to cover retuning time; however, circuitry may be adapted to switch sufficiently quickly to essentially be instantaneous; this may in particular be the case when digital reception beamforming is used to switch reception beams for switching received beams.

A reference beam may be a beam comprising reference signaling, based on which for example a of beam signaling characteristics may be determined, e.g. measured and/or estimated. A signaling beam may comprise signaling like control signaling and/or data signaling and/or reference signaling. A reference beam may be transmitted by a source or transmitting radio node, in which case one or more beam signaling characteristics may be reported to it from a receiver, e.g. a wireless device. However, in some cases it may be received by the radio node from another radio node or wireless device. In this case, one or more beam signaling characteristics may be determined by the radio node. A signaling beam may be a transmission beam, or a reception beam. A set of signaling characteristics may comprise a plurality of subsets of beam signaling characteristics, each subset pertaining to a different reference beam. Thus, a reference beam may be associated to different beam signaling characteristics.

A beam signaling characteristic, respectively a set of such characteristics, may represent and/or indicate a signal strength and/or signal quality of a beam and/or a delay characteristic and/or be associated with received and/or measured signaling carried on a beam. Beam signaling characteristics and/or delay characteristics may in particular pertain to, and/or indicate, a number and/or list and/or order of beams with best (e.g., lowest mean delay and/or lowest spread/range) timing or delay spread, and/or of strongest and/or best quality beams, e.g. with associated delay spread. A beam signaling characteristic may be based on measurement/s performed on reference signaling carried on the reference beam it pertains to. The measurement/s may be performed by the radio node, or another node or wireless device. The use of reference signaling allows improved accuracy and/or gauging of the measurements. In some cases, a beam and/or beam pair may be represented by a beam identity indication, e.g. a beam or beam pair number. Such an indication may be represented by one or more signaling sequences (e.g., a specific reference signaling sequences or sequences), which may be transmitted on the beam and/or beam pair, and/or a signaling characteristic and/or a resource/s used (e.g., time/frequency and/or code) and/or a specific RNTI (e.g., used for scrambling a CRC for some messages or transmissions) and/or by information provided in signaling, e.g. control signaling and/or system signaling, on the beam and/or beam pair, e.g. encoded and/or provided in an information field or as information element in some form of message of signaling, e.g. DCI and/or MAC and/or RRC signaling.

A reference beam may in general be one of a set of reference beams, the second set of reference beams being associated to the set of signaling beams. The sets being associated may refer to at least one beam of the first set being associated and/or corresponding to the second set (or vice versa), e.g. being based on it, for example by having the same analog or digital beamforming parameters and/or precoder and/or the same shape before analog beamforming, and/or being a modified form thereof, e.g. by performing additional analog beamforming. The set of signaling beams may be referred to as a first set of beams, a set of corresponding reference beams may be referred to as second set of beams.

In some variants, a reference beam and/or reference beams and/or reference signaling may correspond to and/or carry random access signaling, e.g. a random access preamble. Such a reference beam or signaling may be transmitted by another radio node. The signaling may indicate which beam is used for transmitting. Alternatively, the reference beams may be beams receiving the random access signaling. Random access signaling may be used for initial connection to the radio node and/or a cell provided by the radio node, and/or for reconnection. Utilising random access signaling facilitates quick and early beam selection. The random access signaling may be on a random access channel, e.g. based on broadcast information provided by the radio node (the radio node performing the beam selection), e.g. with synchronisation signaling (e.g., SSB block and/or associated thereto). The reference signaling may correspond to synchronisation signaling, e.g. transmitted by the radio node in a plurality of beams. The characteristics may be reported on by a node receiving the synchronisation signaling, e.g. in a random access process, e.g. a msg3 for contention resolution, which may be transmitted on a physical uplink shared channel based on a resource allocation provided by the radio node.

A delay characteristic (which may correspond to delay spread information) and/or a measurement report may represent and/or indicate at least one of mean delay, and/or delay spread, and/or delay distribution, and/or delay spread distribution, and/or delay spread range, and/or relative delay spread, and/or energy (or power) distribution, and/or impulse response to received signaling, and/or the power delay profile of the received signals, and/or power delay profile related parameters of the received signal. A mean delay may represent the mean value and/or an averaged value of the delay spread, which may be weighted or unweighted. A distribution may be distribution over time/delay, e.g. of received power and/or energy of a signal. A range may indicate an interval of the delay spread distribution over time/delay, which may cover a predetermined percentage of the delay spread respective received energy or power, e.g. 50% or more, 75% or more, 90% or more, or 100%. A relative delay spread may indicate a relation to a threshold delay, e.g. of the mean delay, and/or a shift relative to an expected and/or configured timing, e.g. a timing at which the signaling would have been expected based on the scheduling, and/or a relation to a cyclic prefix duration (which may be considered on form of a threshold). Energy distribution or power distribution may pertain to the energy or power received over the time interval of the delay spread. A power delay profile may pertain to representations of the received signals, or the received signals energy/power, across time/delay. Power delay profile related parameters may pertain to metrics computed from the power delay profile. Different values and forms of delay spread information and/or report may be used, allowing a wide range of capabilities. The kind of information represented by a measurement report may be predefined, or be configured or configurable, e.g. with a measurement configuration and/or reference signaling configuration, in particular with higher layer signaling like RRC or MAC signaling and/or physical layer signaling like DCI signaling.

In general, different beam pair may differ in at least one beam; for example, a beam pair using a first received beam and a first transmission beam may be considered to be different from a second beam pair using the first received beam and a second transmission beam. A transmission beam using no precoding and/or beamforming, for example using the natural antenna profile, may be considered as a special form of transmission beam of a transmission beam pair. A beam may be indicated to a radio node by a transmitter with a beam indication and/or a configuration, which for example may indicate beam parameters and/or time/frequency resources associated to the beam and/or a transmission mode and/or antenna profile and/or antenna port and/or precoder associated to the beam. Different beams may be provided with different content, for example different received beams may carry different signaling; however, there may be considered cases in which different beams carry the same signaling, for example the same data signaling and/or reference signaling. The beams may be transmitted by the same node and/or transmission point and/or antenna arrangement, or by different nodes and/or transmission points and/or antenna arrangements.

Communicating utilising a beam pair or a beam may comprise receiving signaling on a received beam (which may be a beam of a beam pair), and/or transmitting signaling on a beam, e.g. a beam of a beam pair. The following terms are to be interpreted from the point of view of the referred radio node: a received beam may be a beam carrying signaling received by the radio node (for reception, the radio node may use a reception beam, e.g. directed to the received beam, or be non-beamformed). A transmission beam may be a beam used by the radio node to transmit signaling. A beam pair may consist of a received beam and a transmission beam. The transmission beam and the received beam of a beam pair may be associated to each and/or correspond to each other, e.g. such that signaling on the received beam and signaling on a transmission beam travel essentially the same path (but in opposite directions), e.g. at least in a stationary or almost stationary condition. It should be noted that the terms "first" and "second" do not necessarily denote an order in time; a second signaling may be received and/or transmitted before, or in some cases simultaneous to, first signaling, or vice versa. The received beam and transmission beam of a beam pair may be on the same carrier or frequency range or bandwidth part, e.g. in a TDD operation; however, variants with FDD may be considered as well. Different beam pairs may operate on the same frequency ranges or carriers or bandwidth parts (e.g., such that transmission beams operate on the same frequency range or carriers or bandwidth part, and received beams on the same frequency range or carriers or bandwidth part (the transmission beam and received beams may be on the same or different ranges or carriers or BWPs). Communicating utilizing a first beam pair and/or first beam may be based on, and/or comprise, switching from the second beam pair or second beam to the first beam pair or first beam for communicating. The switching may be controlled by the network, for example a network node (which may be the source or transmitter of the received beam of the first beam pair and/or second beam pair, or be associated thereto, for example associated transmission points or nodes in dual connectivity). Such controlling may comprise transmitting control signaling, e.g. physical layer signaling and/or higher layer signaling. In some cases, the switching may be performed by the radio node without additional control signaling, for example based on measurements on signal quality and/or signal strength of beam pairs (e.g., of first and second received beams), in particular the first beam pair and/or the second beam pair. For example, it may be switched to the first beam pair (or first beam) if the signal quality or signal strength measured on the second beam pair (or second beam) is considered to be insufficient, and/or worse than corresponding measurements on the first beam pair indicate. Measurements performed on a beam pair (or beam) may in particular comprise measurements performed on a received beam of the beam pair. It may be considered that the timing indication may be determined before switching from the second beam pair to the first beam pair for communicating. Thus, the synchronization may be in place 8 and/or the timing indication may be available for synchronising) when starting communication utilizing the first beam pair or first beam. However, in some cases the timing indication may be determined after switching to the first beam pair or first beam. This may be in particular useful if first signaling is expected to be received after the switching only, for example based on a periodicity or scheduled timing of suitable reference signaling on the first beam pair, e.g. first received beam.

In some variants, reference signaling may be and/or comprise CSI-RS, e.g. transmitted by the network node. In other variants, the reference signaling may be transmitted by a UE, e.g. to a network node or other UE, in which case it may comprise and/or be Sounding Reference Signaling. Other, e.g. new, forms of reference signaling may be considered and/or used. In general, a modulation symbol of reference signaling respectively a resource element carrying it may be associated to a cyclic prefix.

Data signaling may be on a data channel, for example on a PDSCH or PSSCH, or on a dedicated data channel, e.g. for low latency and/or high reliability, e.g. a URLLC channel. Control signaling may be on a control channel, for example on a common control channel or a PDCCH or PSCCH, and/or comprise one or more DCI messages or SCI messages. Reference signaling may be associated to control signaling and/or data signaling, e.g. DM-RS and/or PT-RS.

Reference signaling, for example, may comprise DM-RS and/or pilot signaling and/or discovery signaling and/or synchronisation signaling and/or sounding signaling and/or phase tracking signaling and/or cell-specific reference signaling and/or user-specific signaling, in particular CSI-RS. Reference signaling in general may be signaling with one or more signaling characteristics, in particular transmission power and/or sequence of modulation symbols and/or resource distribution and/or phase distribution known to the receiver. Thus, the receiver can use the reference signaling as a reference and/or for training and/or for compensation. The receiver can be informed about the reference signaling by the transmitter, e.g. being configured and/or signaling with control signaling, in particular physical layer signaling and/or higher layer signaling (e.g., DCI and/or RRC signaling), and/or may determine the corresponding information itself, e.g. a network node configuring a UE to transmit reference signaling. Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

References to specific resource structures like an allocation unit and/or block symbol and/or block symbol group and/or transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4, or more symbols, e.g. less symbols than symbols in a slot. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

A transmission quality parameter may in general correspond to the number R of retransmissions and/or number T of total transmissions, and/or coding (e.g., number of coding bits, e.g. for error detection coding and/or error correction coding like FEC coding) and/or code rate and/or BLER and/or BER requirements and/or transmission power level (e.g., minimum level and/or target level and/or base power level P0 and/or transmission power control command, TPC, step size) and/or signal quality, e.g. SNR and/or SIR and/or SINR and/or power density and/or energy density.

A buffer state report (or buffer status report, BSR) may comprise information representing the presence and/or size of data to be transmitted (e.g., available in one or more buffers, for example provided by higher layers). The size may be indicated explicitly, and/or indexed to range/s of sizes, and/or may pertain to one or more different channel/s and/or acknowledgement processes and/or higher layers and/or channel groups/s, e.g., one or more logical channel/s and/or transport channel/s and/or groups thereof: The structure of a BSR may be predefined and/or configurable of configured, e.g. to override and/or amend a predefined structure, for example with higher layer signaling, e.g. RRC signaling. There may be different forms of BSR with different levels of resolution and/or information, e.g. a more detailed long BSR and a less detailed short BSR. A short BSR may concatenate and/or combine information of a long BSR, e.g. providing sums for data available for one or more channels and/or or channels groups and/or buffers, which might be represented individually in a long BSR; and/or may index a less-detailed range scheme for data available or buffered. A BSR may be used in lieu of a scheduling request, e.g. by a network node scheduling or allocating (uplink) resources for the transmitting radio node like a wireless device or UE or IAB node.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or a data channel. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier, and/or the symbol time length. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths, even on the same carrier.

Signaling may generally comprise one or more (e.g., modulation) symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangement associated to a UE or terminal may be smaller (e.g., in size and/or number of antenna elements or arrays) than the antenna arrangement associated to a network node. Antenna elements of an antenna arrangement may be configurable for different arrays, e.g. to change the beamforming characteristics. In particular, antenna arrays may be formed by combining one or more independently or separately controllable antenna elements or subarrays. The beams may be provided by analog beamforming, or in some variants by digital beamforming, or by hybrid beamforming combing analog and digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) or DCA (Digital-to-Analog Converter, alternatively a DCA chain) to convert digital control information into an analog antenna feed for the whole antenna arrangement (the ADC/DCA may be considered part of, and/or connected or connectable to, antenna circuitry) or vice versa. A scenario in which an ADC or DCA is controlled directly for beamforming may be considered an analog beamforming scenario; such controlling may be performed after encoding/decoding and/or after modulation symbols have been mapped to resource elements. This may be on the level of antenna arrangements using the same ADC/DCA, e.g. one antenna element or a group of antenna elements associated to the same ADC/DCA. Digital beamforming may correspond to a scenario in which processing for beamforming is provided before feeding signaling to the ADC/DCA, e.g. by using one or more precoder/s and/or by precoding information, for example before and/or when mapping modulation symbols to resource elements. Such a precoder for beamforming may provide weights, e.g. for amplitude and/or phase, and/or may be based on a (precoder) codebook, e.g. selected from a codebook. A precoder may pertain to one beam or more beams, e.g. defining the beam or beams. The codebook may be configured or configurable, and/or be predefined. DFT beamforming may be considered a form of digital beamforming, wherein a DFT procedure is used to form one or more beams. Hybrid forms of beamforming may be considered.

A beam may be defined by a spatial and/or angular and/or spatial angular distribution of radiation and/or a spatial angle (also referred to as solid angle) or spatial (solid) angle distribution into which radiation is transmitted (for transmission beamforming) or from which it is received (for reception beamforming). Reception beamforming may comprise only accepting signals coming in from a reception beam (e.g., using analog beamforming to not receive outside reception beam/s), and/or sorting out signals that do not come in in a reception beam, e.g. in digital postprocessing, e.g. digital beamforming. A beam may have a solid angle equal to or smaller than 4*pi sr (4*pi correspond to a beam covering all directions), in particular smaller than 2*pi, or pi, or pi/2, or pi/4 or pi/8 or pi/16. In particular for high frequencies, smaller beams may be used. Different beams may have different directions and/or sizes (e.g., solid angle and/or reach). A beam may have a main direction, which may be defined by a main lobe (e.g., center of the main lobe, e.g. pertaining to signal strength and/or solid angle, which may be averaged and/or weighted to determine the direction), and may have one or more sidelobes. A lobe may generally be defined to have a continuous or contiguous distribution of energy and/or power transmitted and/or received, e.g. bounded by one or more contiguous or contiguous regions of zero energy (or practically zero energy). A main lobe may comprise the lobe with the largest signal strength and/or energy and/or power content. However, sidelobes usually appear due to limitations of beamforming, some of which may carry signals with significant strength, and may cause multi-path effects. A sidelobe may generally have a different direction than a main lobe and/or other side lobes, however, due to reflections a sidelobe still may contribute to transmitted and/or received energy or power. A beam may be swept and/or switched over time, e.g., such that its (main) direction is changed, but its shape (angular/solid angle distribution) around the main direction is not changed, e.g. from the transmitter's views for a transmission beam, or the receiver's view for a reception beam, respectively. Sweeping may correspond to continuous or near continuous change of main direction (e.g., such that after each change, the main lobe from before the change covers at least partly the main lobe after the change, e.g. at least to 50 or 75 or 90 percent). Switching may correspond to switching direction non-continuously, e.g. such that after each change, the main lobe from before the change does not cover the main lobe after the change, e.g. at most to 50 or 25 or 10 percent.

Signal strength may be a representation of signal power and/or signal energy, e.g. as seen from a transmitting node or a receiving node. A beam with larger strength at transmission (e.g., according to the beamforming used) than another beam does may not necessarily have larger strength at the receiver, and vice versa, for example due to interference and/or obstruction and/or dispersion and/or absorption and/or reflection and/or attrition or other effects influencing a beam or the signaling it carries. Signal quality may in general be a representation of how well a signal may be received over noise and/or interference. A beam with better signal quality than another beam does not necessarily have a larger beam strength than the other beam. Signal quality may be represented for example by SIR, SNR, SINR, BER, BLER, Energy per resource element over noise/interference or another corresponding quality measure. Signal quality and/or signal strength may pertain to, and/or may be measured with respect to, a beam, and/or specific signaling carried by the beam, e.g. reference signaling and/or a specific channel, e.g. a data channel or control channel. Signal strength may be represented by received signal strength, and/or relative signal strength, e.g. in comparison to a reference signal (strength).

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling and/or Single-Carrier based signaling, e.g. SC-FDE signaling, may be considered alternatives).

A radio node may generally be considered a device or node adapted for wireless and/or radio (and/or millimeter wave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN or other wireless communication network as described herein.

The terms user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary. A wireless device generally may comprise, and/or be implemented as, processing circuitry and/or radio circuitry, which may comprise one or more chips or sets of chips. The circuitry and/or circuitries may be packaged, e.g. in a chip housing, and/or may have one or more physical interfaces to interact with other circuitry and/or for power supply. Such a wireless device may be intended for use in a user equipment or terminal.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, an RRH may be also be implemented as a network node, depending on the kind of circuitry and/or functionality implemented therein.

Communication circuitry may comprise radio circuitry and/or cable circuitry.

Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A wireless communication network may be or comprise a radio access network and/or a backhaul network (e.g. a relay or backhaul network or an IAB network), and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Transmitting acknowledgement signaling may in general be based on and/or in response to subject transmission, and/or to control signaling scheduling subject transmission. Such control signaling and/or subject signaling may be transmitted by a signaling radio node (which may be a network node, and/or a node associated to it, e.g. in a dual connectivity scenario. Subject transmission and/or subject signaling may be transmission or signaling to which ACK/NACK or acknowledgement information pertains, e.g. indicating correct or incorrect reception and/or decoding of the subject transmission or signaling. Subject signaling or transmission may in particular comprise and/or be represented by data signaling, e.g. on a PDSCH or PSSCH, or some forms of control signaling, e.g. on a PDCCH or PSSCH, for example for specific formats.

A signaling characteristic may be based on a type or format of a scheduling grant and/or scheduling assignment, and/or type of allocation, and/or timing of acknowledgement signaling and/or the scheduling grant and/or scheduling assignment, and/or resources associated to acknowledgement signaling and/or the scheduling grant and/or scheduling assignment. For example, if a specific format for a scheduling grant (scheduling or allocating the allocated resources) or scheduling assignment (scheduling the subject transmission for acknowledgement signaling) is used or detected, the first or second communication resource may be used. Type of allocation may pertain to dynamic allocation (e.g., using DCI/PDCCH) or semi-static allocation (e.g., for a configured grant). Timing of acknowledgement signaling may pertain to a slot and/or symbol/s the signaling is to be transmitted. Resources used for acknowledgement signaling may pertain to the allocated resources. Timing and/or resources associated to a scheduling grant or assignment may represent a search space or CORESET (a set of resources configured for reception of PDCCH transmissions) in which the grant or assignment is received. Thus, which transmission resource to be used may be based on implicit conditions, requiring low signaling overhead.

Scheduling may comprise indicating, e.g. with control signaling like DCI or SCI signaling and/or signaling on a control channel like PDCCH or PSCCH, one or more scheduling opportunities of a configuration intended to carry data signaling or subject signaling. The configuration may be represented or representable by, and/or correspond to, a table. A scheduling assignment may for example point to an opportunity of the reception allocation configuration, e.g. indexing a table of scheduling opportunities. In some cases, a reception allocation configuration may comprise 15 or 16 scheduling opportunities. The configuration may in particular represent allocation in time. It may be considered that the reception allocation configuration pertains to data signaling, in particular on a physical data channel like PDSCH or PSSCH. In general, the reception allocation configuration may pertain to downlink signaling, or in some scenarios to sidelink signaling. Control signaling scheduling subject transmission like data signaling may point and/or index and/or refer to and/or indicate a scheduling opportunity of the reception allocation configuration. It may be considered that the reception allocation configuration is configured or configurable with higher-layer signaling, e.g. RRC or MAC layer signaling. The reception allocation configuration may be applied and/or applicable and/or valid for a plurality of transmission timing intervals, e.g. such that for each interval, one or more opportunities may be indicated or allocated for data signaling. These approaches allow efficient and flexible scheduling, which may be semi-static, but may updated or reconfigured on useful timescales in response to changes of operation conditions.

Control information, e.g., in a control information message, in this context may in particular be implemented as and/or represented by a scheduling assignment, which may indicate subject transmission for feedback (transmission of acknowledgement signaling), and/or reporting timing and/or frequency resources and/or code resources. Reporting timing may indicate a timing for scheduled acknowledgement signaling, e.g. slot and/or symbol and/or resource set. Control information may be carried by control signaling.

Subject transmissions may comprise one or more individual transmissions. Scheduling assignments may comprise one or more scheduling assignments. It should generally be noted that in a distributed system, subject transmissions, configuration and/or scheduling may be provided by different nodes or devices or transmission points. Different subject transmissions may be on the same carrier or different carriers (e.g., in a carrier aggregation), and/or same or different bandwidth parts, and/or on the same or different layers or beams, e.g. in a MIMO scenario, and/or to same or different ports. Generally, subject transmissions may pertain to different HARQ or ARQ processes (or different sub-processes, e.g. in MIMO with different beams/layers associated to the same process identifier, but different sub-process-identifiers like swap bits). A scheduling assignment and/or a HARQ codebook may indicate a target HARQ structure. A target HARQ structure may for example indicate an intended HARQ response to a subject transmission, e.g. the number of bits and/or whether to provide code block group level response or not. However, it should be noted that the actual structure used may differ from the target structure, e.g. due to the total size of target structures for a subpattern being larger than the predetermined size.

Transmitting acknowledgement signaling, also referred to as transmitting acknowledgement information or feedback information or simply as ARQ or HARQ feedback or feedback or reporting feedback, may comprise, and/or be based on determining correct or incorrect reception of subject transmission/s, e.g. based on error coding and/or based on scheduling assignment/s scheduling the subject transmissions. Transmitting acknowledgement information may be based on, and/or comprise, a structure for acknowledgement information to transmit, e.g. the structure of one or more subpatterns, e.g. based on which subject transmission is scheduled for an associated subdivision. Transmitting acknowledgement information may comprise transmitting corresponding signaling, e.g. at one instance and/or in one message and/or one channel, in particular a physical channel, which may be a control channel. In some cases, the channel may be a shared channel or data channel, e.g. utilising rate-matching of the acknowledgment information. The acknowledgement information may generally pertain to a plurality of subject transmissions, which may be on different channels and/or carriers, and/or may comprise data signaling and/or control signaling. The acknowledgment information may be based on a codebook, which may be based on one or more size indications and/or assignment indications (representing HARQ structures), which may be received with a plurality of control signalings and/or control messages, e.g. in the same or different transmission timing structures, and/or in the same or different (target) sets of resources. Transmitting acknowledgement information may comprise determining the codebook, e.g. based on control information in one or more control information messages and/or a configuration. A codebook may pertain to transmitting acknowledgement information at a single and/or specific instant, e.g. a single PUCCH or PUSCH transmission, and/or in one message or with jointly encoded and/or modulated acknowledgement information. Generally, acknowledgment information may be transmitted together with other control information, e.g. a scheduling request and/or measurement information.

Acknowledgement signaling may in some cases comprise, next to acknowledgement information, other information, e.g. control information, in particular, uplink or sidelink control information, like a scheduling request and/or measurement information, or similar, and/or error detection and/or correction information, respectively associated bits. The payload size of acknowledgement signaling may represent the number of bits of acknowledgement information, and/or in some cases the total number of bits carried by the acknowledgement signaling, and/or the number of resource elements needed. Acknowledgement signaling and/or information may pertain to ARQ and/or HARQ processes; an ARQ process may provide ACK/NACK (and perhaps additional feedback) feedback, and decoding may be performed on each (re-)transmission separately, without soft-buffering/ soft-combining intermediate data, whereas HARQ may comprise soft-buffering/soft-combining of intermediate data of decoding for one or more (re-)transmissions.

Subject transmission may be data signaling or control signaling. The transmission may be on a shared or dedicated channel. Data signaling may be on a data channel, for example on a PDSCH or PSSCH, or on a dedicated data channel, e.g. for low latency and/or high reliability, e.g. a URLLC channel. Control signaling may be on a control channel, for example on a common control channel or a PDCCH or PSCCH, and/or comprise one or more DCI messages or SCI messages. In some cases, the subject transmission may comprise, or represent, reference signaling. For example, it may comprise DM-RS and/or pilot signaling and/or discovery signaling and/or sounding signaling and/or phase tracking signaling and/or cell-specific reference signaling and/or user-specific signaling, in particular CSI-RS. A subject transmission may pertain to one scheduling assignment and/or one acknowledgement signaling process (e.g., according to identifier or subidentifier), and/or one subdivision. In some cases, a subject transmission may cross the borders of subdivisions in time, e.g. due to being scheduled to start in one subdivision and extending into another, or even crossing over more than one subdivision. In this case, it may be considered that the subject transmission is associated to the subdivision it ends in.

It may be considered that transmitting acknowledgement information, in particular of acknowledgement information, is based on determining whether the subject transmission/s has or have been received correctly, e.g. based on error coding and/or reception quality. Reception quality may for example be based on a determined signal quality. Acknowledgement information may generally be transmitted to a signaling radio node and/or node arrangement and/or to a network and/or network node.

Acknowledgement information, or bit/s of a subpattern structure of such information (e.g., an acknowledgement information structure, may represent and/or comprise one or more bits, in particular a pattern of bits. Multiple bits pertaining to a data structure or substructure or message like a control message may be considered a subpattern. The structure or arrangement of acknowledgement information may indicate the order, and/or meaning, and/or mapping, and/or pattern of bits (or subpatterns of bits) of the information. The structure or mapping may in particular indicate one or more data block structures, e.g. code blocks and/or code block groups and/or transport blocks and/or messages, e.g. command messages, the acknowledgement information pertains to, and/or which bits or subpattern of bits are associated to which data block structure. In some cases, the mapping may pertain to one or more acknowledgement signaling processes, e.g. processes with different identifiers, and/or one or more different data streams. The configuration or structure or codebook may indicate to which process/es and/or data stream/s the information pertains. Generally, the acknowledgement information may comprise one or more subpatterns, each of which may pertain to a data block structure, e.g. a code block or code block group or transport block. A subpattern may be arranged to indicate acknowledgement or non-acknowledgement, or another retransmission state like non-scheduling or non-reception, of the associated data block structure. It may be considered that a subpattern comprises one bit, or in some cases more than one bit. It should be noted that acknowledgement information may be subjected to significant processing before being transmitted with acknowledgement signaling. Different configurations may indicate different sizes and/or mapping and/or structures and/or pattern.

An acknowledgment signaling process (providing acknowledgment information) may be a HARQ process, and/or be identified by a process identifier, e.g. a HARQ process identifier or subidentifier. Acknowledgement signaling and/or associated acknowledgement information may be referred to as feedback or acknowledgement feedback. It should be noted that data blocks or structures to which subpatterns may pertain may be intended to carry data (e.g., information and/or systemic and/or coding bits). However, depending on transmission conditions, such data may be received or not received (or not received correctly), which may be indicated correspondingly in the feedback. In some cases, a subpattern of acknowledgement signaling may comprise padding bits, e.g. if the acknowledgement information for a data block requires fewer bits than indicated as size of the subpattern. Such may for example happen if the size is indicated by a unit size larger than required for the feedback.

Acknowledgment information may generally indicate at least ACK or NACK, e.g. pertaining to an acknowledgment signaling process, or an element of a data block structure like a data block, subblock group or subblock, or a message, in particular a control message. Generally, to an acknowledgment signaling process there may be associated one specific subpattern and/or a data block structure, for which acknowledgment information may be provided. Acknowledgement information may comprise a plurality of pieces of information, represented in a plurality of ARQ and/or HARQ structures.

An acknowledgment signaling process may determine correct or incorrect reception, and/or corresponding acknowledgement information, of a data block like a transport block, and/or substructures thereof, based on coding bits associated to the data block, and/or based on coding bits associated to one or more data block and/or subblocks and/or subblock group/s. Acknowledgement information (determined by an acknowledgement signaling process) may pertain to the data block as a whole, and/or to one or more subblocks or subblock groups. A code block may be considered an example of a subblock, whereas a code block group may be considered an example of a subblock group. Accordingly, the associated subpattern may comprise one or more bits indicating reception status or feedback of the data block, and/or one or more bits indicating reception status or feedback of one or more subblocks or subblock groups. Each subpattern or bit of the subpattern may be associated and/or mapped to a specific data block or subblock or subblock group. In some variants, correct reception for a data block may be indicated if all subblocks or subblock groups are correctly identified. In such a case, the subpattern may represent acknowledgement information for the data block as a whole, reducing overhead in comparison to provide acknowledgement information for the subblocks or subblock groups. The smallest structure (e.g. subblock/subblock group/data block) the subpattern provides acknowledgement information for and/or is associated to may be considered its (highest) resolution. In some variants, a subpattern may provide acknowledgment information regarding several elements of a data block structure and/or at different resolution, e.g. to allow more specific error detection. For example, even if a subpattern indicates acknowledgment signaling pertaining to a data block as a whole, in some variants higher resolution (e.g., subblock or subblock group resolution) may be provided by the subpattern. A subpattern may generally comprise one or more bits indicating ACK/NACK for a data block, and/or one or more bits for indicating ACK/NACK for a subblock or subblock group, or for more than one subblock or subblock group.

A subblock and/or subblock group may comprise information bits (representing the data to be transmitted, e.g. user data and/or downlink/sidelink data or uplink data). It may be considered that a data block and/or subblock and/or subblock group also comprises error one or more error detection bits, which may pertain to, and/or be determined based on, the information bits (for a subblock group, the error detection bit/s may be determined based on the information bits and/or error detection bits and/or error correction bits of the subblock/s of the subblock group). A data block or substructure like subblock or subblock group may comprise error correction bits, which may in particular be determined based on the information bits and error detection bits of the block or substructure, e.g. utilising an error correction coding scheme, in particular for forward error correction (FEC), e.g. LDPC or polar coding and/or turbo coding. Generally, the error correction coding of a data block structure (and/or associated bits) may cover and/or pertain to information bits and error detection bits of the structure. A subblock group may represent a combination of one or more code blocks, respectively the corresponding bits. A data block may represent a code block or code block group, or a combination of more than one code block groups. A transport block may be split up in code blocks and/or code block groups, for example based on the bit size of the information bits of a higher layer data structure provided for error coding and/or size requirements or preferences for error coding, in particular error correction coding. Such a higher layer data structure is sometimes also referred to as transport block, which in this context represents information bits without the error coding bits described herein, although higher layer error handling information may be included, e.g. for an internet protocol like TCP. However, such error handling information represents information bits in the context of this disclosure, as the acknowledgement signaling procedures described treat it accordingly.

In some variants, a subblock like a code block may comprise error correction bits, which may be determined based on the information bit/s and/or error detection bit/s of the subblock. An error correction coding scheme may be used for determining the error correction bits, e.g. based on LDPC or polar coding or Reed-Mueller coding. In some cases, a subblock or code block may be considered to be defined as a block or pattern of bits comprising information bits, error detection bit/s determined based on the information bits, and error correction bit/s determined based on the information bits and/or error detection bit/s. It may be considered that in a subblock, e.g. code block, the information bits (and possibly the error correction bit/s) are protected and/or covered by the error correction scheme or corresponding error correction bit/s. A code block group may comprise one or more code blocks. In some variants, no additional error detection bits and/or error correction bits are applied, however, it may be considered to apply either or both. A transport block may comprise one or more code block groups. It may be considered that no additional error detection bits and/or error correction bits are applied to a transport block, however, it may be considered to apply either or both. In some specific variants, the code block group/s comprise no additional layers of error detection or correction coding, and the transport block may comprise only additional error detection coding bits, but no additional error correction coding. This may particularly be true if the transport block size is larger than the code block size and/or the maximum size for error correction coding. A subpattern of acknowledgement signaling (in particular indicating ACK or NACK) may pertain to a code block, e.g. indicating whether the code block has been correctly received. It may be considered that a subpattern pertains to a subgroup like a code block group or a data block like a transport block. In such cases, it may indicate ACK, if all subblocks or code blocks of the group or data/transport block are received correctly (e.g. based on a logical AND operation), and NACK or another state of non-correct reception if at least one subblock or code block has not been correctly received. It should be noted that a code block may be considered to be correctly received not only if it actually has been correctly received, but also if it can be correctly reconstructed based on soft-combining and/or the error correction coding.

A subpattern/HARQ structure may pertain to one acknowledgement signaling process and/or one carrier like a component carrier and/or data block structure or data block.

It may in particular be considered that one (e.g. specific and/or single) subpattern pertains, e.g. is mapped by the codebook, to one (e.g., specific and/or single) acknowledgement signaling process, e.g. a specific and/or single HARQ process. It may be considered that in the bit pattern, subpatterns are mapped to acknowledgement signaling processes and/or data blocks or data block structures on a one-to-one basis. In some variants, there may be multiple subpatterns (and/or associated acknowledgment signaling processes) associated to the same component carrier, e.g. if multiple data streams transmitted on the carrier are subject to acknowledgement signaling processes. A subpattern may comprise one or more bits, the number of which may be considered to represent its size or bit size. Different bit n-tupels (n being 1 or larger) of a subpattern may be associated to different elements of a data block structure (e.g., data block or subblock or subblock group), and/or represent different resolutions. There may be considered variants in which only one resolution is represented by a bit pattern, e.g. a data block. A bit n-tupel may represent acknowledgement information (also referred to a feedback), in particular ACK or NACK, and optionally, (if n>1), may represent DTX/DRX or other reception states. ACK/NACK may be represented by one bit, or by more than one bit, e.g. to improve disambiguity of bit sequences representing ACK or NACK, and/or to improve transmission reliability.

The acknowledgement information or feedback information may pertain to a plurality of different transmissions, which may be associated to and/or represented by data block structures, respectively the associated data blocks or data signaling. The data block structures, and/or the corresponding blocks and/or signaling, may be scheduled for simultaneous transmission, e.g. for the same transmission timing structure, in particular within the same slot or subframe, and/or on the same symbol/s. However, alternatives with scheduling for non-simultaneous transmission may be considered. For example, the acknowledgment information may pertain to data blocks scheduled for different transmission timing structures, e.g. different slots (or mini-slots, or slots and mini-slots) or similar, which may correspondingly be received (or not or wrongly received). Scheduling signaling may generally comprise indicating resources, e.g. time and/or frequency resources, for example for receiving or transmitting the scheduled signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol (or allocation unit) may generally represent a starting symbol (allocation unit) or an ending symbol (allocation unit) for transmitting and/or receiving. A starting symbol (or allocation unit) may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol (or allocation unit) is associated to control signaling (e.g., on a control channel), the control signaling may be in response to received signaling (in sidelink or downlink), e.g. representing acknowledgement signaling associated thereto, which may be HARQ or ARQ signaling. An ending symbol (or allocation unit) may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol (or allocation unit) may be determined based on, and/or in relation to, such an ending symbol (or allocation unit).

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may in general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers. A resource structure may in time domain comprise and/or represent a time interval, e.g. one of more allocation units and/or symbols and/or slots and/or subframes. In general, any reference to a symbol as a time interval may be considered as a reference to an allocation unit as a more general term, unless the reference to the symbol is specific, e.g. referring to a specific division or modulation technique, or to modulation symbols as transmission structures.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising millimeter waves, in particular above one of the thresholds 10 GHz or 20 GHz or 50 GHz or 52 GHz or 52.6 GHz or 60 GHz or 72 GHz or 100 GHz or 114 GHz. Such communication may utilise one or more carriers, e.g. in FDD and/or carrier aggregation. Upper frequency boundaries may correspond to 300 GHz or 200 GHz or 120 GHz or any of the thresholds larger than the one representing the lower frequency boundary.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on an LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

A control region generally may comprise time and/or frequency domain resources. A control region may be intended and/or indicated and/or configured, e.g. with higher layer signaling, for transmission of control signaling, in particular first control signaling. A control region may be periodic or aperiodic; in some cases, it may repeat at certain time intervals (e.g., within a larger time interval) or be set or triggered or indicated for limited usage, e.g. in general in relation to a timing structure like a frame structure associated to the wireless communication network and/or used therein. A control region may be represented by a CORESET or a resource set in time and/or frequency domain. To a control region, there may be associated a search space. The search space may contain and/or be based on the control region. In this disclosure, features associated to a control region may be associated to the associated search space and vice versa. A search space may provide parameters and/or features associated to control signaling to be expected and/or processed and/or received and/or transmitted on resource of the control region, e.g. one or more signaling characteristics of control signaling associated to the search space, e.g. type of control signaling (e.g., format) and/or allowable aggregation level and/or possible location in the control region. It should be noted that the control region may be shifted in time domain from the perspective of the transmitter and receiver, e.g. due to delay effects and/or travel time of signaling. However, the same term will be used for both perspectives, as there will be an unambiguous association; in particular, the transmitter will intend reception in the control region of the receiver. A control region and/or search space may be configured by a network, e.g. a transmitting radio node, e.g. with higher layer signaling and/or broadcast signaling. A search space may be device-specific (e.g., configured specifically for one device, and/or with unicast signaling) or a common search space, e.g. configured with multicast and/or broadcast signaling. A control region may span one or more block symbols and/or allocation units and/or have an extension in frequency domain corresponding to a control region bandwidth and/or a plurality of subcarriers or resource blocks, e.g. physical and/or virtual resource blocks. It should be noted that control signaling of the set of control signalings may comprise control signaling that may occupy time/frequency resource/s (e.g., a set of resources) included in the control region and/or search space, but do not necessarily have to use all resources of the control region and/or search space. In general, the control region and/or search space may represent resources (e.g., a set of time/frequency resources) a receiver may monitor and/or search for control signaling, e.g. control signaling addressed to and/or intended for the receiver. Parameters and/or characteristics of the search space may limit and/or define the monitoring in more detail.

In general, a symbol or allocation unit may represent and/or be associated to a symbol time length (or unit time length), which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. an LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be sent over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time and/or frequency domain for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time. A control region may be associated, e.g. via configuration and/or determination, to one or more specific UEs and/or formats of PDCCH and/or DCI and/or identifiers, e.g. UE identifiers and/or RNTIs or carrier/cell identifiers, and/or be represented and/or or associated to a CORESET and/or a search space.

The duration of a symbol (symbol time length or interval or allocation unit) of the transmission timing structure may generally be dependent on a numerology and/or carrier, wherein the numerology and/or carrier may be configurable. The numerology may be the numerology to be used for the scheduled transmission.

A transmission timing structure may comprise a plurality of allocation units or symbols, and/or define an interval comprising several symbols or allocation units (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols and/or allocation units defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot. In some cases, a timing structure may be represented by a frame structure. Timing structures may be associated to specific transmitters and/or cells and/or beams and/or signalings.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In some cases, a shifting object like a signaling or signals or sequences or information may be shifted, e.g. relative to a predecessor (e.g., one is subject to a shift, and the shifted version is used), or relative to another (e.g., one associated to one signaling or allocation unit may be shifted to another associated to a second signaling or allocation unit, both may be used). One possible way of shifting is operating a code on it, e.g. to multiply each element of a shifting object with a factor. A ramping (e.g. multiplying with a monotonously increasing or periodic factor) may be considered an example of shifting. Another is a cyclic shift in a domain or interval. A cyclic shift (or circular shift) may correspond to a rearrangement of the elements in the shifting object, corresponding to moving the final element or elements to the first position, while shifting all other entries to the next position, or by performing the inverse operation (such that the shifted object as the result will have the same elements as the shifting object, in a shifted but similar order). Shifting in general may be specific to an interval in a domain, e.g. an allocation unit in time domain, or a bandwidth in frequency domain. For example, it may be considered that signals or modulation symbols in an allocation unit are shifted, such that the order of the modulation symbols or signals is shifted in the allocation unit. In another example, allocation units may be shifted, e.g. in a larger time interval—this may leave signals in the allocation units unshifted with reference to the individual allocation unit, but may change the order of the allocation units. Domains for shifting may for example be time domain and/or phase domain and/or frequency domain. Multiple shifts in the same domain or different domains, and/or the same interval or different intervals (differently sized intervals, for example) may be performed.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM) or IEEE standards as IEEE 802.11 ad or IEEE 802.11 ay. While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

| Abbreviation | Explanation |
| --- | --- |
| ACK/NACK | Acknowledgment/Negative Acknowledgement |
| ARQ | Automatic Repeat reQuest |
| BER | Bit Error Rate |

| Abbreviation | Explanation |
| --- | --- |
| BLER | Block Error Rate |
| BPSK | Binary Phase Shift Keying |
| BS | Base Station |
| BW | BandWidth |
| BWP | BandWidth Part |
| CAZAC | Constant Amplitude Zero Cross Correlation |
| CB | Code Block |
| CBG | Code Block Group |
| CDM | Code Division Multiplex |
| CM | Cubic Metric |
| CP | Cyclic Prefix |
| CORESET | Control Resource Set |
| CQI | Channel Quality Information |
| CRC | Cyclic Redundancy Check |
| CRS | Common reference signal |
| CSI | Channel State Information |
| CSI-RS | Channel state information reference signal |
| DAI | Downlink Assignment Indicator |
| DCI | Downlink Control Information |
| DFT | Discrete Fourier Transform |
| DFT-S-OFDM | DFT-spread-OFDM |
| DM(-)RS | Demodulation reference signal(ing) |
| eMBB | enhanced Mobile BroadBand |
| EPRE | Energy Per Resource Element |
| FDD | Frequency Division Duplex |
| FDE | Frequency Domain Equalisation |
| FDF | Frequency Domain Filtering |
| FDM | Frequency Division Multiplex |
| HARQ | Hybrid Automatic Repeat Request |
| IAB | Integrated Access and Backhaul |
| IFFT | Inverse Fast Fourier Transform |
| IR | Impulse Response |
| ISI | Inter Symbol Interference |
| MBB | Mobile Broadband |
| MCS | Modulation and Coding Scheme |
| MIMO | Multiple-input-multiple-output |
| MRC | Maximum-ratio combining |
| MRT | Maximum-ratio transmission |
| MU-MIMO | Multiuser multiple-input-multiple-output |
| NW | Network, may be represented by a network node |
| OFDM/A | Orthogonal Frequency Division Multiplex/Multiple Access |
| PAPR | Peak to Average Power Ratio |
| PDCCH | Physical Downlink Control Channel |
| PDSCH | Physical Downlink Shared Channel |
| PRACH | Physical Random Access CHannel |
| PRB | Physical Resource Block |
| PUCCH | Physical Uplink Control Channel |
| PUSCH | Physical Uplink Shared Channel |
| (P)SCCH | (Physical) Sidelink Control Channel |
| PSS | Primary Synchronisation Signal(ing) |
| (P)SSCH | (Physical) Sidelink Shared Channel |
| QAM | Quadrature Amplitude Modulation |
| OCC | Orthogonal Cover Code |
| QPSK | Quadrature Phase Shift Keying |
| PSD | Power Spectral Density |
| RAN | Radio Access Network |
| RAT | Radio Access Technology |
| RB | Resource Block |
| RE | Resource Element |
| RNTI | Radio Network Temporary Identifier |
| RRC | Radio Resource Control |
| RX | Receiver, Reception, Reception-related/side |
| SA | Scheduling Assignment |
| SC-FDE | Single Carrier Frequency Domain Equalisation |
| SC-FDM/A | Single Carrier Frequency Division Multiplex/Multiple Access |
| SCI | Sidelink Control Information |
| SCS | Subcarrier spacing |
| SINR | Signal-to-interference-plus-noise ratio |
| SIR | Signal-to-interference ratio |
| SNR | Signal-to-noise-ratio |
| SR | Scheduling Request |
| SRS | Sounding Reference Signal(ing) |
| SSS | Secondary Synchronisation Signal(ing) |
| SVD | Singular-value decomposition |
| TB | Transport Block |
| TDD | Time Division Duplex |
| TDM | Time Division Multiplex |
| TX | Transmitter, Transmission, Transmission-related/side |
| UCI | Uplink Control Information |
| UE | User Equipment |
| URLLC | Ultra Low Latency High Reliability Communication |
| VL-MIMO | Very-large multiple-input-multiple-output |
| ZF | Zero Forcing |
| ZP | Zero-Power, e.g. muted CSI-RS symbol |

Abbreviations may be considered to follow 3GPP usage if applicable.

The invention claimed is:

1. A method of operating a radio node in a wireless communication network, the method comprising: communicating based on a signaling structure, the signaling structure comprising at least one of a number R of long symbols and a number Nsym of regular symbols, a long symbol having a long cyclic prefix (CP) that does not exceed a length of a symbol part of a long symbol for a given subcarrier spacing.

2. The method according to claim 1, wherein the signaling structure corresponds to one of:
one symbol and an associated cyclic prefix; and
a half-subframe.

3. The method according to claim 2, wherein the signaling structure includes one long symbol, wherein the symbol length of the symbol part of the long symbol is at least as long as the cyclic prefix length.

4. The method according to claim 2, wherein the cyclic prefix length is at least one of represented by and corresponds to one of a number of samples and a duration in time.

5. The method according to claim 1, wherein the cyclic prefix length is at least one of represented by and corresponds to one of a number of samples and a duration in time.

6. The method according to claim 1, wherein communicating is based on an OFDM-based waveform.

7. The method according to claim 1, wherein a subcarrier spacing associated to the signaling structure corresponds to at least 960 KHz.

8. A radio node for a wireless communication network, the radio node comprising radio circuitry configured to communicate based on a signaling structure, the signaling structure comprising at least one of a number R of long symbols and a number Nsym of regular symbols, a long symbol having a long cyclic prefix (CP) that does not exceed a length of a symbol part of a long symbol for a given subcarrier spacing.

9. A method of operating a radio node in a wireless communication network, the method comprising: communicating based on a signaling structure, the signaling structure comprising one or more symbols, a cyclic prefix with a cyclic prefix length being associated to each of the one or more symbols, the cyclic prefix length being at least one of based on, representable by and corresponding to $$q = 144 \times \frac{N_{fft}}{2048} + b,$$

Nfft corresponding to a number of samples of a Fast Fourier Transformation used for processing the signaling structure, and b being an integer, the signaling structure including at least one long symbol having a long cyclic prefix length that does not exceed a length of a symbol part of the long symbol for a given subcarrier spacing.

10. The method according to claim 9, wherein the signaling structure corresponds to one of:
   one symbol and an associated cyclic prefix; and
   a half-subframe.

11. The method according to claim 9, wherein the cyclic prefix length is at least one of represented by and corresponds to one of a number of samples and a duration in time.

12. The method according to claim 9, wherein communicating is based on an OFDM-based waveform.

13. The method according to claim 9, wherein a subcarrier spacing associated to the signaling structure corresponds to at least 960 KHz.

14. The method according to claim 9, a subcarrier spacing associated to the signaling structure corresponds to at least 1920 KHz.

15. A radio node in a wireless communication network, the radio node comprising:
   processing circuitry configured to configure a signaling structure, the signaling structure comprising one or more symbols, a cyclic prefix with a cyclic prefix length being associated to each of the one or more symbols, the cyclic prefix length being at least one of based on, representable by and corresponding to $$q = 144 \times \frac{N_{fft}}{2048} + b,$$

Nfft corresponding to a number of samples of a Fast Fourier Transformation used for processing the signaling structure, and b being an integer, the signaling structure including at least one long symbol having a long cyclic prefix length that does not exceed a length of a symbol part of the long symbol for a given subcarrier spacing; and
   radio circuitry configured to communicate based on the signaling structure.

16. A non-transitory computer storage medium storing an executable program comprising instructions that when executed causes processing circuitry to at least one of control and perform a method, the method comprising:
   communicating based on a signaling structure, the signaling structure comprising at least one of a number R of long symbols and a number Nsym of regular symbols, a long symbol having a long cyclic prefix (CP) that does not exceed a length of a symbol part of a long symbol for a given subcarrier spacing.

* * * * *